United States Patent
Hirota et al.

(10) Patent No.: US 12,431,773 B2
(45) Date of Patent: Sep. 30, 2025

(54) METHOD FOR MANUFACTURING UNIT COIL FOR STATOR OF ROTARY ELECTRIC MACHINE, DEVICE FOR MANUFACTURING UNIT COIL FOR STATOR OF ROTARY ELECTRIC MACHINE, ROTARY ELECTRIC MACHINE, AND METHOD FOR MANUFACTURING A ROTARY ELECTRIC MACHINE

(71) Applicant: Mitsubishi Electric Corporation, Tokyo (JP)

(72) Inventors: Yutaka Hirota, Tokyo (JP); Tadashi Maeda, Tokyo (JP); Takeshi Yagi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 158 days.

(21) Appl. No.: 17/260,011

(22) PCT Filed: Aug. 20, 2019

(86) PCT No.: PCT/JP2019/032375
§ 371 (c)(1),
(2) Date: Jan. 13, 2021

(87) PCT Pub. No.: WO2020/075390
PCT Pub. Date: Apr. 16, 2020

(65) Prior Publication Data
US 2021/0328486 A1    Oct. 21, 2021

(30) Foreign Application Priority Data

Oct. 12, 2018 (JP) .................................. 2018-193129

(51) Int. Cl.
H02K 15/043    (2025.01)

(52) U.S. Cl.
CPC ..... *H02K 15/0431* (2025.01); *H02K 2213/03* (2013.01)

(58) Field of Classification Search
CPC .... H02K 15/045; H02K 15/0431; B21D 7/02; B21D 7/024; B21F 3/04
(Continued)

(56) References Cited

U.S. PATENT DOCUMENTS 7,825,562 B2    11/2010    Naganawa et al.
9,570,966 B2    2/2017    Hashimoto et al.
(Continued)

FOREIGN PATENT DOCUMENTS

JP    S63121451 A    5/1988
JP    2008104293 A    5/2008
(Continued)

OTHER PUBLICATIONS

Office Action (Notice of Reasons for Refusal) issued on Aug. 31, 2021, in corresponding Japanese Patent Application No. 2020-550007 and English translation of the Office Action. (6 pages).
(Continued)

*Primary Examiner* — Livius R. Cazan
(74) *Attorney, Agent, or Firm* — BUCHANAN, INGERSOLL & ROONEY PC

(57) ABSTRACT

The unit coil is formed by: bending the coil end portions of the intermediate body such that, in a layer in which a length in an axial direction between the coil end portions is large, positions of the coil end portions projecting furthest from the accommodation portions in the axial direction move away from positions of the accommodation portions in the stacking direction, compared to the previous state; and aligning the positions, in the axial direction, of the coil end portions at an inner side of the annular shape, for each of the layers.

12 Claims, 32 Drawing Sheets

(58) Field of Classification Search
USPC .................................................. 72/139, 145
See application file for complete search history.

(56) References Cited

U.S. PATENT DOCUMENTS

| | | | |
|---|---|---|---|
| 9,590,479 B2 | 3/2017 | Tsuge et al. | |
| 2007/0079642 A1* | 4/2007 | Bibeau | H02K 15/045 |
| | | | 72/307 |
| 2008/0093948 A1* | 4/2008 | Naganawa | H02K 15/045 |
| | | | 310/203 |
| 2013/0009509 A1 | 1/2013 | Tsuge et al. | |
| 2014/0285056 A1* | 9/2014 | Tomohara | H02K 15/045 |
| | | | 29/596 |
| 2015/0013149 A1 | 1/2015 | Hashimoto et al. | |
| 2015/0028704 A1* | 1/2015 | Ohsawa | H02K 3/12 |
| | | | 310/71 |
| 2015/0372573 A1* | 12/2015 | Hashimoto | H02K 15/0431 |
| | | | 29/596 |

FOREIGN PATENT DOCUMENTS

| | | |
|---|---|---|
| JP | 4234749 B2 | 3/2009 |
| JP | 2013179772 A | 9/2013 |
| JP | 2013192360 A | 9/2013 |
| JP | 2016039660 A | 3/2016 |
| WO | 2011111682 A1 | 9/2011 |

OTHER PUBLICATIONS

International Search Report (PCT/ISA/210) issued on Nov. 12, 2019, by the Japan Patent Office as the International Searching Authority for International Application No. PCT/JP2019/032375.
Written Opinion (PCT/ISA/237) issued on Nov. 12, 2019, by the Japan Patent Office as the International Searching Authority for International Application No. PCT/JP2019/032375.

* cited by examiner

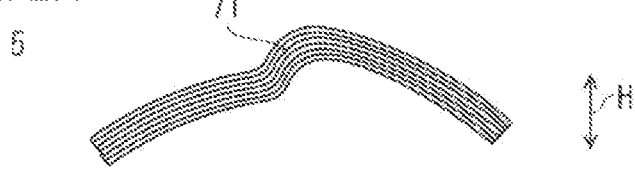
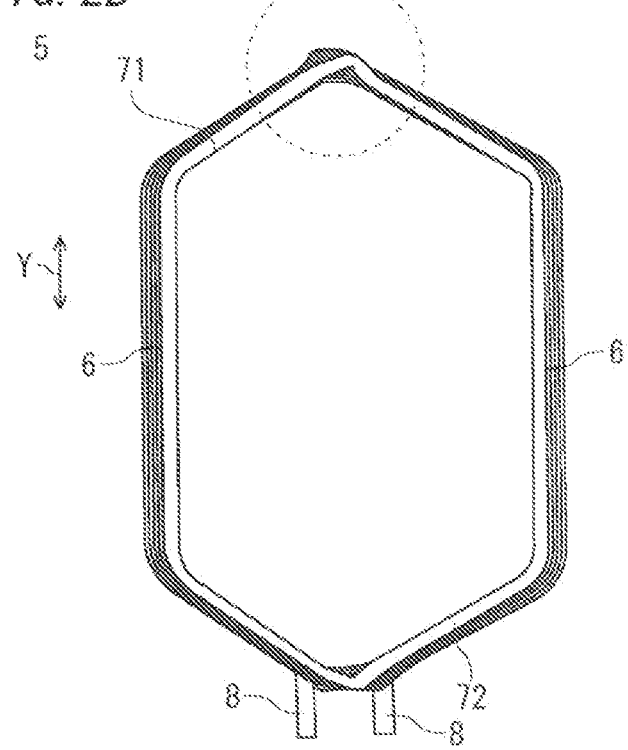
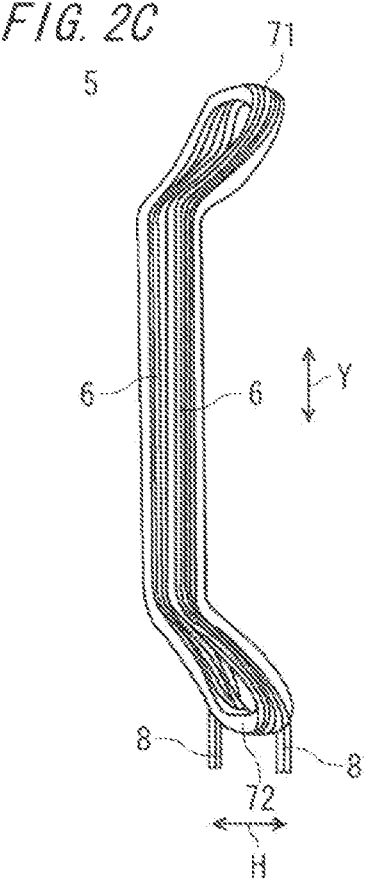
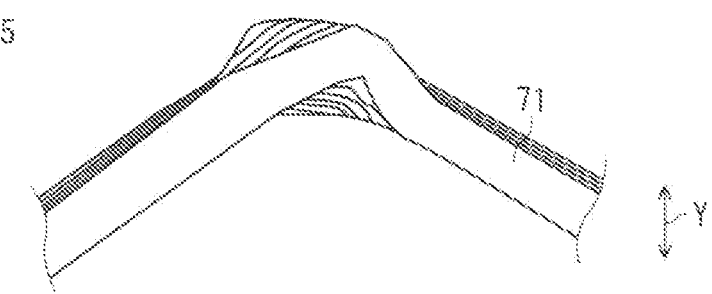

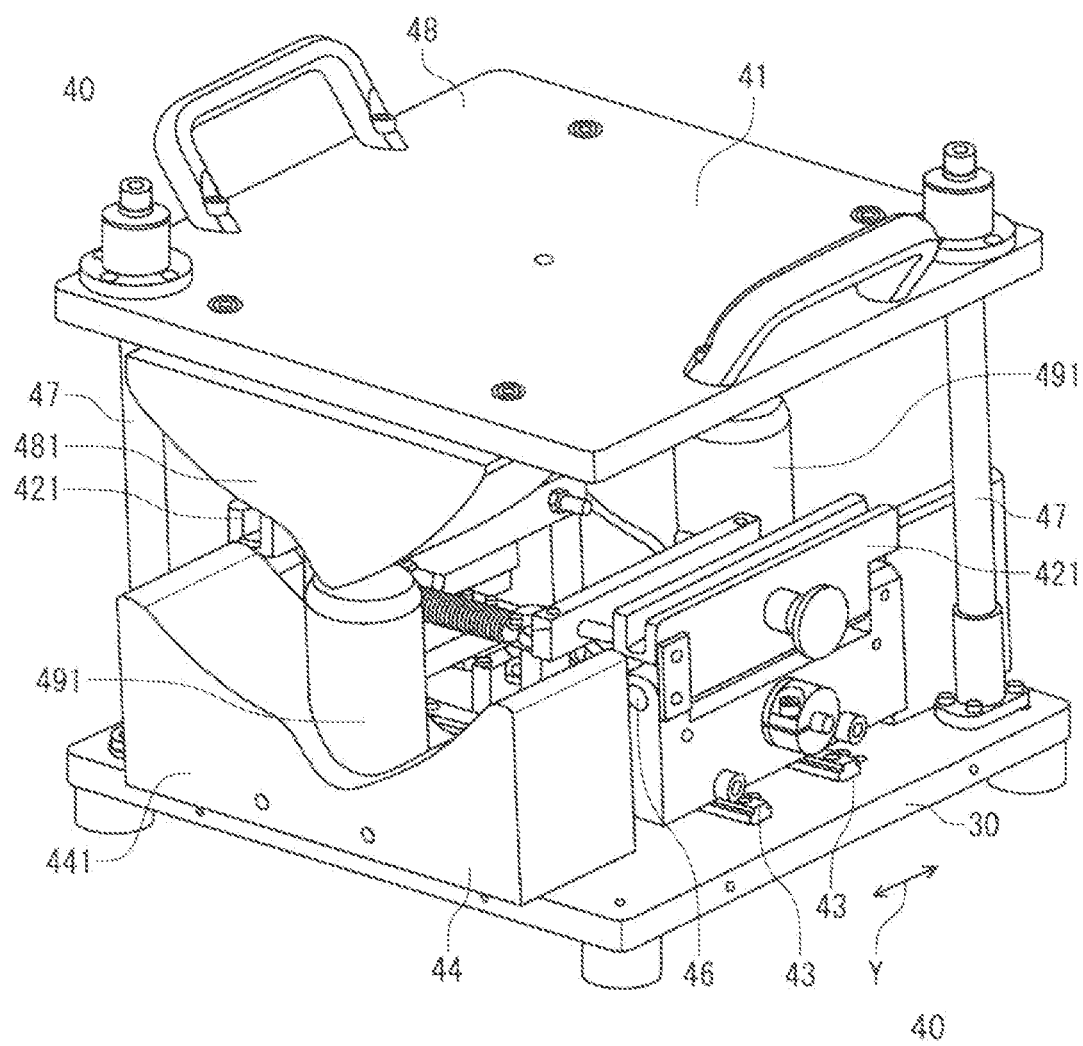

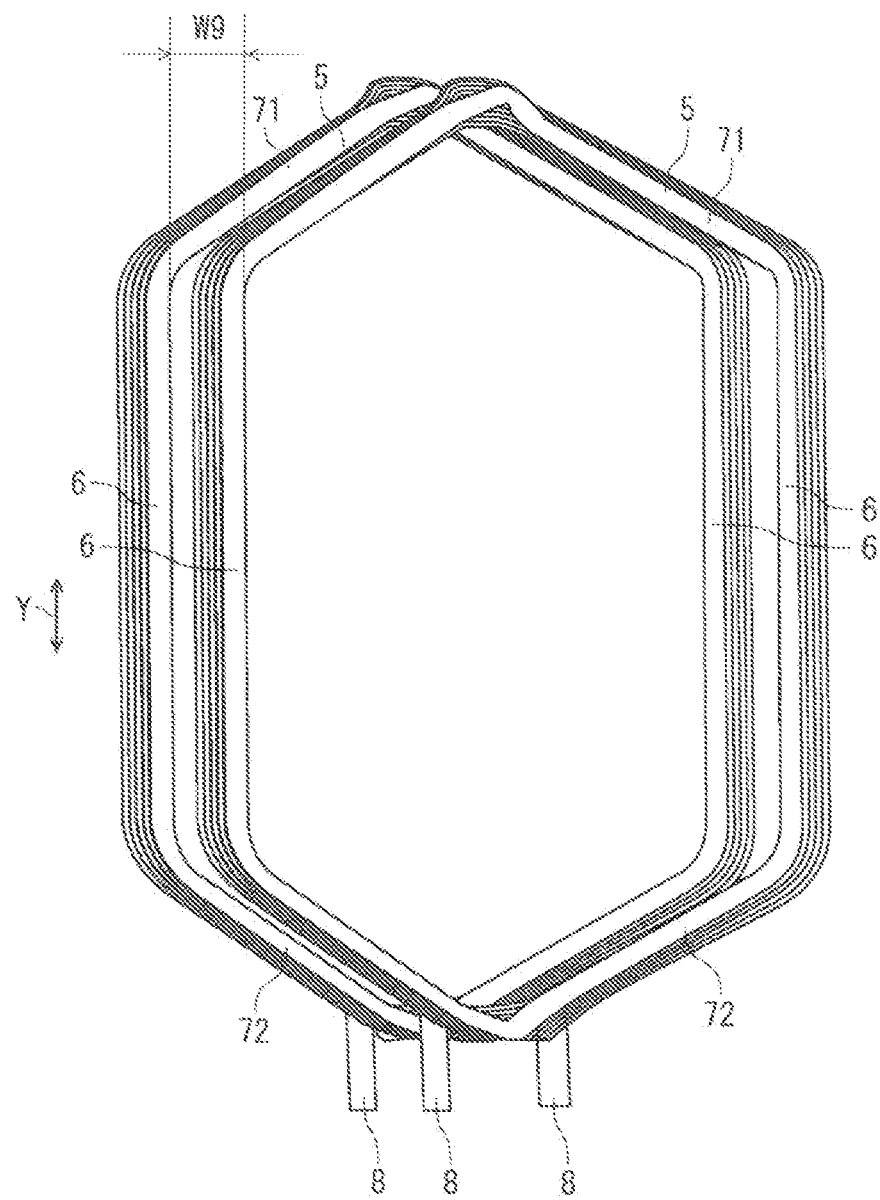

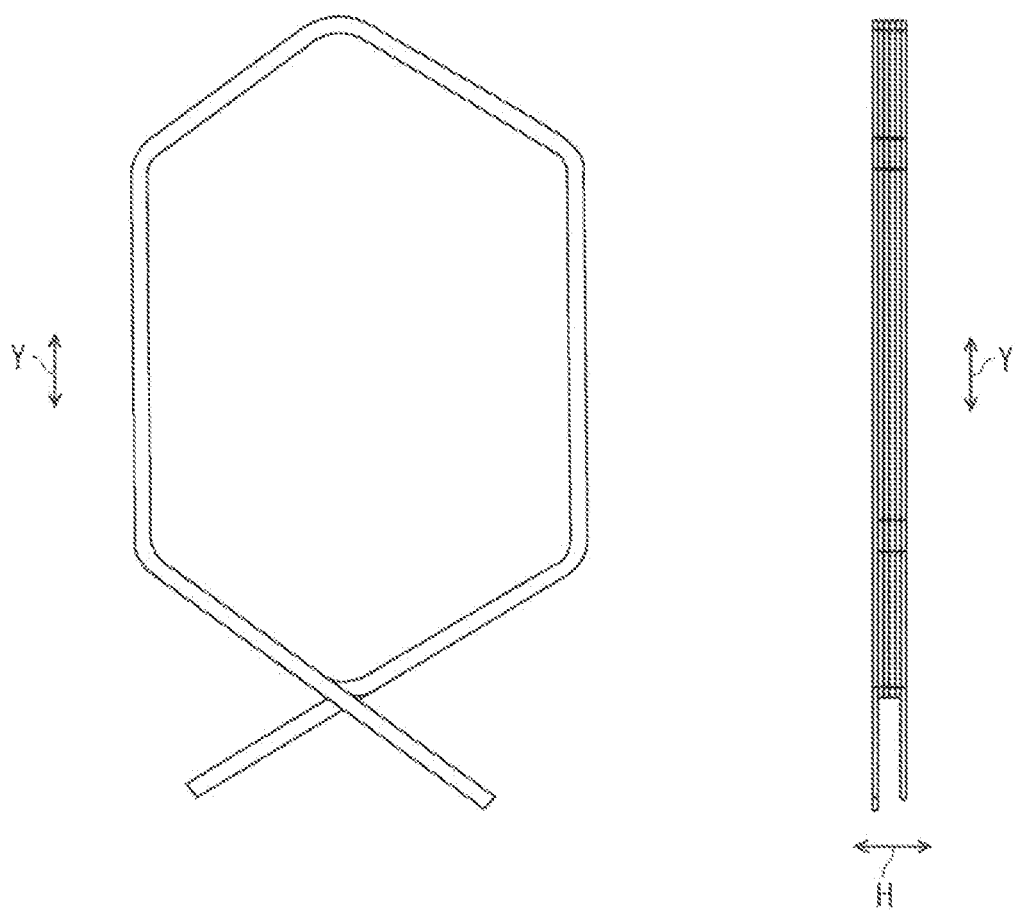

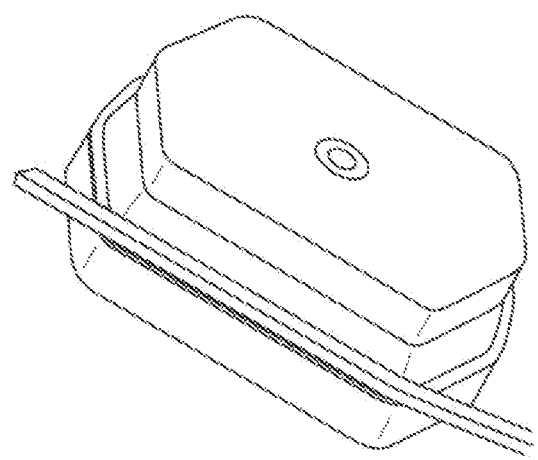
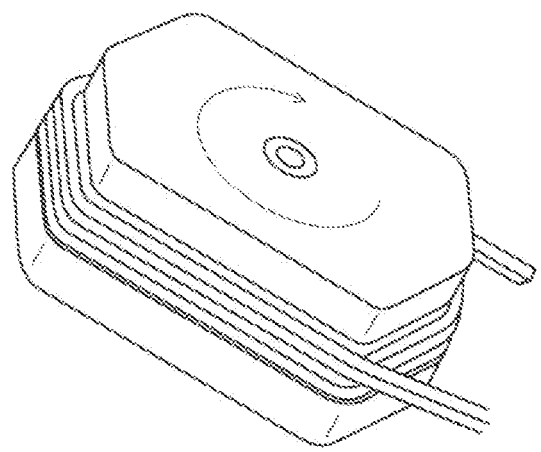
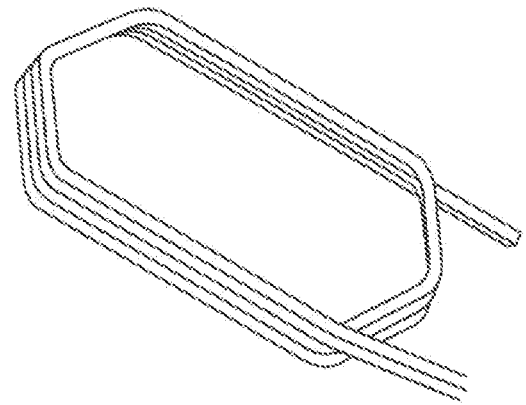
FIG. 25

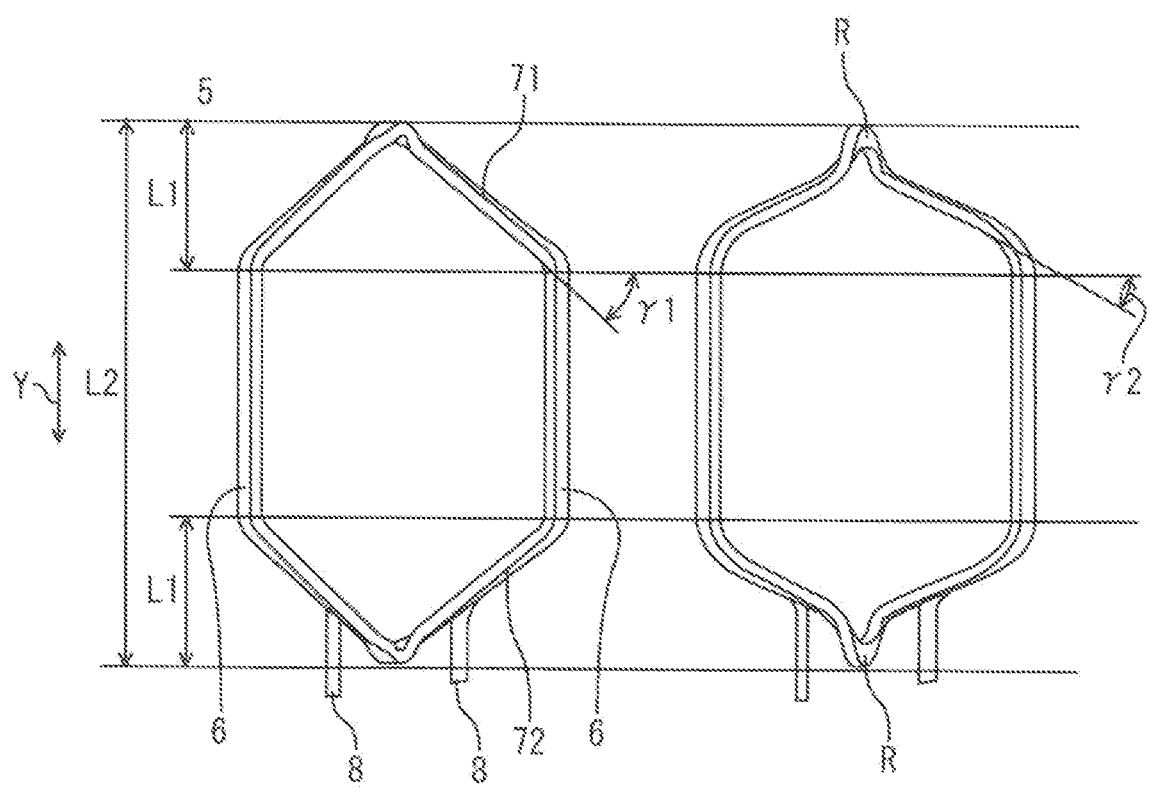

METHOD FOR MANUFACTURING UNIT COIL FOR STATOR OF ROTARY ELECTRIC MACHINE, DEVICE FOR MANUFACTURING UNIT COIL FOR STATOR OF ROTARY ELECTRIC MACHINE, ROTARY ELECTRIC MACHINE, AND METHOD FOR MANUFACTURING A ROTARY ELECTRIC MACHINE

TECHNICAL FIELD

The present disclosure relates to a method and a device for manufacturing a unit coil for a stator of a rotary electric machine, and the rotary electric machine.

BACKGROUND ART

Electric motors for trains have been required to be further downsized and have higher outputs. Therefore, in an inner rotor type rotary electric machine having coils formed by a distributed winding method in which a conductive wire having a rectangular cross section is wound a plurality of times, developments of a unit coil manufacturing method and a unit coil shape capable of reducing the length of coil end portions of a coil have been desired.

In a step of mounting coils formed through distributed winding, unit coils are manually inserted and mounted in a stator core while being shaped such that overlapping, in a radial direction, of coil end portions of adjacent unit coils in a circumferential direction is suppressed as much as possible (e.g., Patent Document 1 and Patent Document 2).

CITATION LIST

Patent Document

Patent Document 1: International Publication No. WO2011/111682
Patent Document 2: Japanese Patent Publication No. 4234749

SUMMARY OF THE INVENTION

Problems to be Solved by the Invention

In the conventional method and device for manufacturing a unit coil for a stator of a rotary electric machine, forming a stator is a work that requires labor and skill, which causes a problem of low productivity. In addition, when a coil is formed, a tool such as a wooden hammer or a spatula used for the work damages an insulating film on the coil, and insulating performance is deteriorated, which causes a problem regarding quality.

The present disclosure has been made to solve the above problem, and an object of the present disclosure is to provide a method and a device for manufacturing a unit coil for a stator of a rotary electric machine, and the rotary electric machine, which prevent deterioration in insulating performance and achieve high productivity.

Solution to the Problems

A method for manufacturing a unit coil for a stator of a rotary electric machine disclosed in the present disclosure is a method for manufacturing a unit coil for a stator of a rotary electric machine, in which the unit coil is inserted in a plurality of slots formed on an inner circumferential side of an annular stator core at intervals in a circumferential direction, and a plurality of the unit coils are arranged in an annular shape to form a stator coil, wherein the unit coil is formed in an annular shape, and has accommodation portions to be accommodated in predetermined two slots among the respective slots, and coil end portions connecting both ends, in an axial direction of the rotary electric machine, of each accommodation portion, and the method includes:
a winding step of winding a conductive wire a plurality of times into an annular shape to stack the conductive wire in a plurality of layers such that each of the coil end portions is stacked in layers so as to have a stair-like outer shape in a stacking direction and each of the accommodation portions is stacked in layers so as to have a linear outer shape in the stacking direction, thereby forming an intermediate body of the unit coil; and
a forming step of forming the unit coil by bending the coil end portions of the intermediate body such that, in a layer in which a length in the axial direction between the coil end portions is large, positions of the coil end portions projecting furthest from the accommodation portions in the axial direction move away from positions of the accommodation portions in the stacking direction, compared to the state in the winding step, and by aligning the positions, in the axial direction, of the coil end portions at the inner side of the annular shape, for each of the layers.

Meanwhile, a device for manufacturing a unit coil for a stator of a rotary electric machine disclosed in the present disclosure is a device for manufacturing a unit coil for a stator of a rotary electric machine, to be used for the winding step of the aforementioned method for manufacturing a unit coil for a stator of a rotary electric machine, and
the device includes:
a base plate;
a first shaft member and a second shaft member disposed on the base plate at both ends, in the axial direction, of formation positions of the coil end portions of the intermediate body, each shaft member being cylindrical and having a stair-like outer shape;
a third shaft member, a fourth shaft member, a fifth shaft member, and a sixth shaft member disposed on the base plate at both ends, in the axial direction, of formation positions of the accommodation portions of the intermediate body, each shaft member being cylindrical and having a linear outer shape; and
a winding portion for winding the conductive wire along the outer shapes of the first shaft member, the second shaft member, the third shaft member, the fourth shaft member, the fifth shaft member, and the sixth shaft member.

Meanwhile, a rotary electric machine disclosed in the present disclosure includes:
a stator including an annular stator core having a plurality of slots formed on an inner circumferential side thereof at intervals in a circumferential direction, and a stator coil composed of a plurality of unit coils arranged in an annular shape and inserted in the slots; and
a rotor rotatably disposed so as to oppose the inner circumferential side of the stator via a gap, wherein
the unit coil is formed in an annular shape, and has accommodation portions accommodated in predetermined two slots among the respective slots, and coil end portions connecting both ends, in an axial direction of the rotary electric machine, of each accommodation portion, the unit coil is formed by winding a conductive wire a plurality of times into an annular shape so as to be stacked in a plurality of layers, and when the unit coil is deformed such that positions of the coil end portions coincide with positions of the accommodation portions in a stacking direction, each of the coil end portions is stacked in layers so as to have a stair-like outer shape in the stacking direction and each of the accommodation portions is stacked in layers so as to have a linear outer shape in the stacking direction, and the coil end portions are bent such that, in a layer in which a length in the axial direction between the coil end portions is large, the positions of the coil end portions projecting furthest from the accommodation portions in the axial direction move away from the positions of the accommodation portions in the stacking direction, and the positions, in the axial direction, of the coil end portions at the inner side of the annular shape are aligned for each of the layers.

Effect of the Invention

According to the method and the device for manufacturing a unit coil for a stator of a rotary electric machine, and the rotary electric machine, it is possible to provide a rotary electric machine that prevents deterioration in insulating performance and achieves high productivity.

BRIEF DESCRIPTION OF THE DRAWINGS

FIG. 2A is a top view showing the structure of the unit coil shown in FIG. 1B before being inserted in the stator core.

FIG. 2B is a front view showing the structure of the unit coil shown in FIG. 1B before being inserted in the stator core.

FIG. 2C is a side view showing the structure of the unit coil shown in FIG. 1B before being inserted in the stator core.

FIG. 2D is a partially enlarged view showing the structure of a part, surrounded by a dotted line circle, of the unit coil shown in FIG. 2B.

FIG. 11 is a perspective view showing the structure of a forming device for manufacturing the unit coil shown in FIG. 2.

FIG. 21 is a diagram for describing an interval between two unit coils, shown in FIG. 2, arranged in an annular shape.

FIG. 24A is a top view showing the structure of an intermediate body of the unit coil shown in FIG. 23A.

FIG. 24B is a front view showing the structure of the intermediate body of the unit coil shown in FIG. 23A.

FIG. 24C is a side view showing the structure of the intermediate body of the unit coil shown in FIG. 22A.

FIG. 25 is a perspective view showing a manufacturing method for the intermediate body of the unit coil shown in FIG. 22A.

FIG. 28A shows the structure of the unit coil according to the present disclosure shown in FIG. 1B.

FIG. 28B shows the structure of the unit coil according to the other comparative example shown FIG. 27B.

DESCRIPTION OF EMBODIMENTS

Embodiment 1

The present disclosure describes a method and a device for manufacturing a unit coil for a stator of a rotary electric machine, which are used for manufacturing a stator of a rotary electric machine. In the following description, a unit coil for a stator of a rotary electric machine may be simply referred to as "unit coil". A unit coil is inserted in a plurality of slots which are formed on an inner circumferential side of an annular stator core at intervals in the circumferential direction. A plurality of the unit coils are arranged in an annular shape, thereby forming a stator coil.

Each unit coil is formed in an annular shape, and includes: accommodation portions to be accommodated in predetermined two slots among the respective slots; and coil end portions connecting both ends, in the axial direction of the rotary electric machine, of each accommodation portion.

Figure 1A:
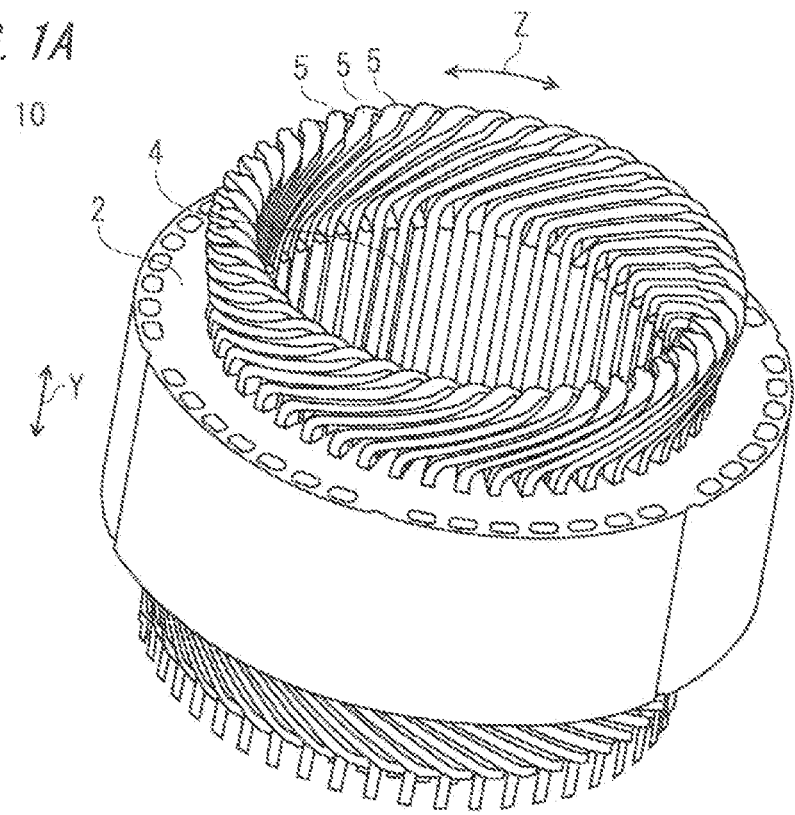
FIG. 1A is a perspective view showing the structure of a stator of a rotary electric machine according to embodiment 1.

FIG. 1A is a perspective view showing the structure of a stator of a rotary electric machine according to embodiment 1.

Figure 1B:
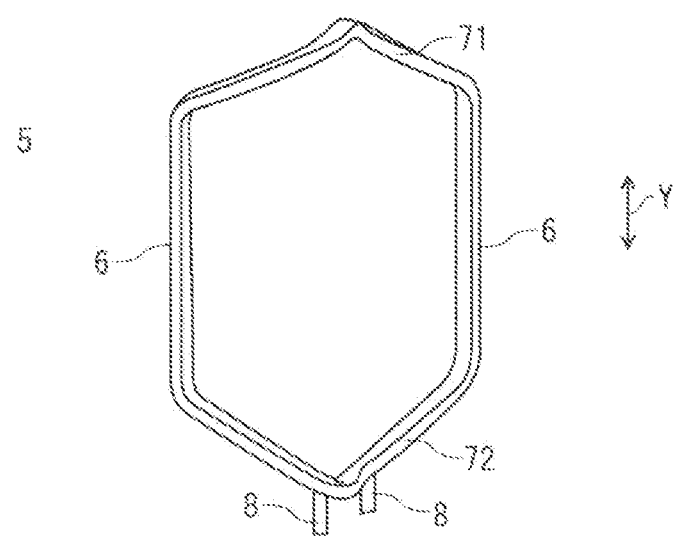
FIG. 1B is a perspective view showing the structure of a unit coil after being inserted in a stator core of the stator shown in FIG. 1A.

FIG. 1B is a perspective view showing the structure of one unit coil among a plurality of unit coils forming the stator shown in FIG. 1A.

FIG. 2A is a top view showing the structure of the unit coil shown in FIG. 1B.

FIG. 2B is a front view showing the structure of the unit coil shown in FIG. 1B.

FIG. 2C is a side view showing the structure of the unit coil shown in FIG. 1B.

FIG. 2D is a partially enlarged view showing the structure of a part, surrounded by a dotted line circle, of the unit coil shown in FIG. 2B.

Figure 3:
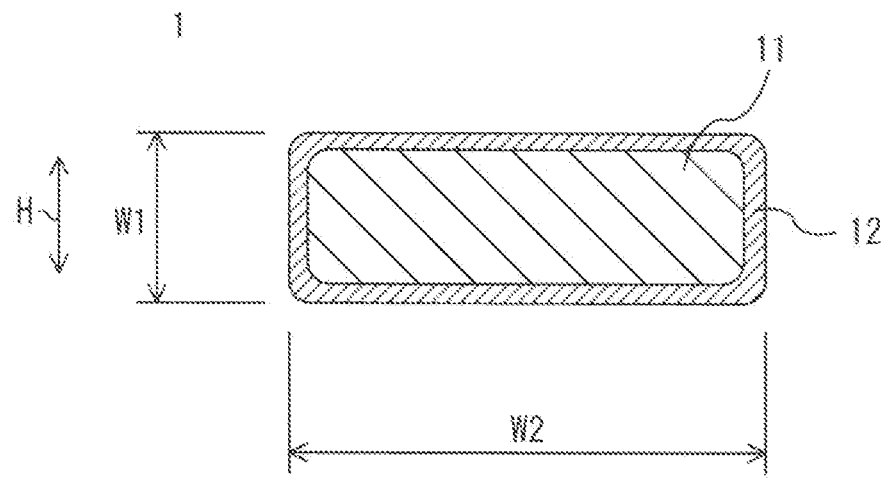
FIG. 3 is a cross-sectional view showing the structure of a rectangular conductive wire forming the unit coil shown in FIG. 2.

FIG. 3 is a cross-sectional view showing the structure of a rectangular conductive wire forming the unit coil shown in FIG. 2.

Figure 4:
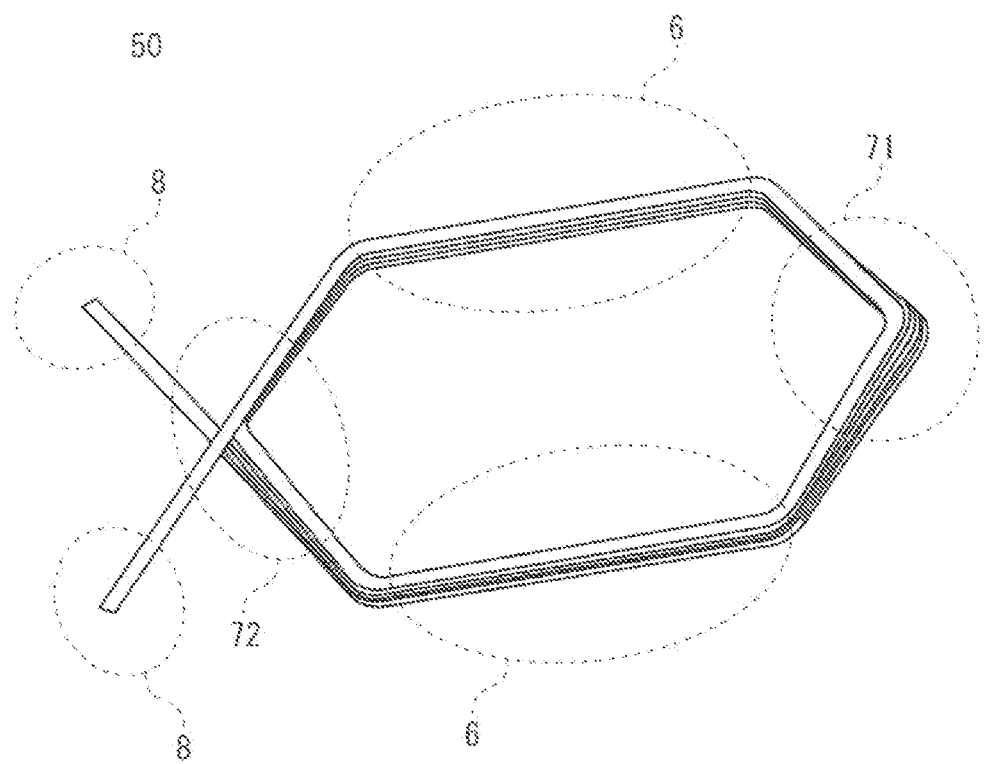
FIG. 4 is a perspective view showing the structure of an intermediate body of the unit coil shown in FIG. 2.

FIG. 4 is a perspective view showing the structure of an intermediate body of the unit coil shown in FIG. 2.

Figure 5A:
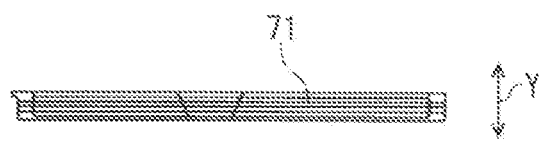
FIG. 5A is a top view showing the structure of the intermediate body of the unit coil shown in FIG. 4.

FIG. 5A is a top view showing the structure of the intermediate body of the unit coil shown in FIG. 4.

Figure 5B:
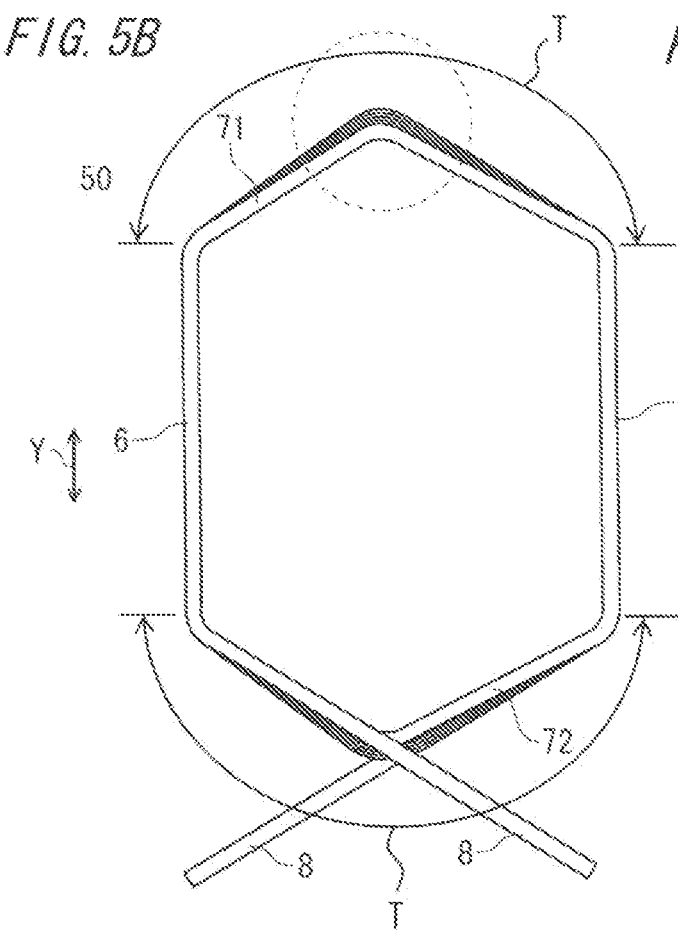
FIG. 5B is a front view showing the structure of the intermediate body of the unit coil shown in FIG. 4.

FIG. 5B is a front view showing the structure of the intermediate body of the unit coil shown in FIG. 4.

Figure 5C:
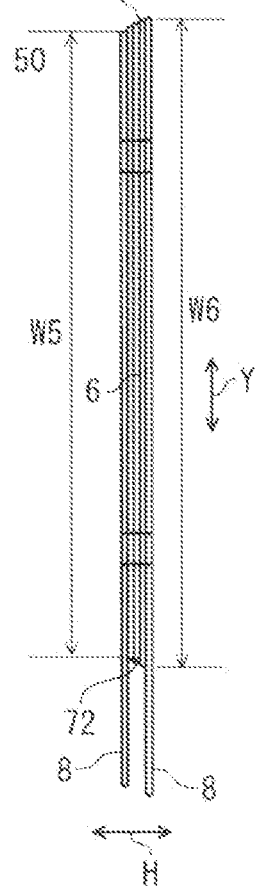
FIG. 5C is a side view showing the structure of the intermediate body of the unit coil shown in FIG. 4.

FIG. 5C is a side view showing the structure of the intermediate body of the unit coil shown in FIG. 4.

Figure 5D:
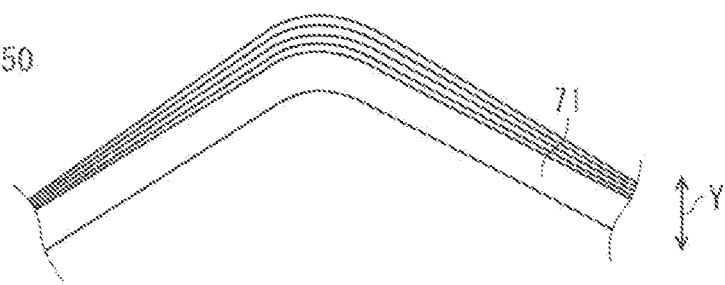
FIG. 5D is a partially enlarged view showing the structure of a part, surrounded by a dotted line circle, of the intermediate body of the unit coil shown in FIG. 4.

FIG. 5D is a partially enlarged view showing the structure of a part, surrounded by a dotted line circle, of the intermediate body of the unit coil shown in FIG. 4.

Figure 6:
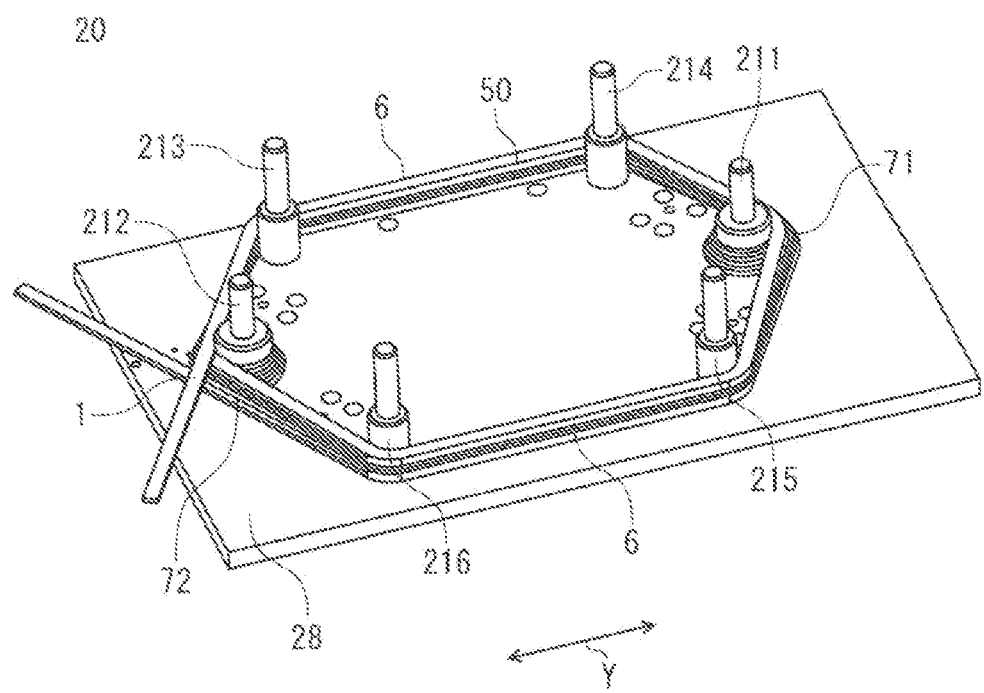
FIG. 6 is a perspective view showing a part of the structure of a winding device for manufacturing the intermediate body of the unit coil shown in FIG. 4.

FIG. 6 is a perspective view showing the structure, excluding a winding portion, of a winding device for manufacturing the intermediate body of the unit coil shown in FIG. 4.

Figure 7:
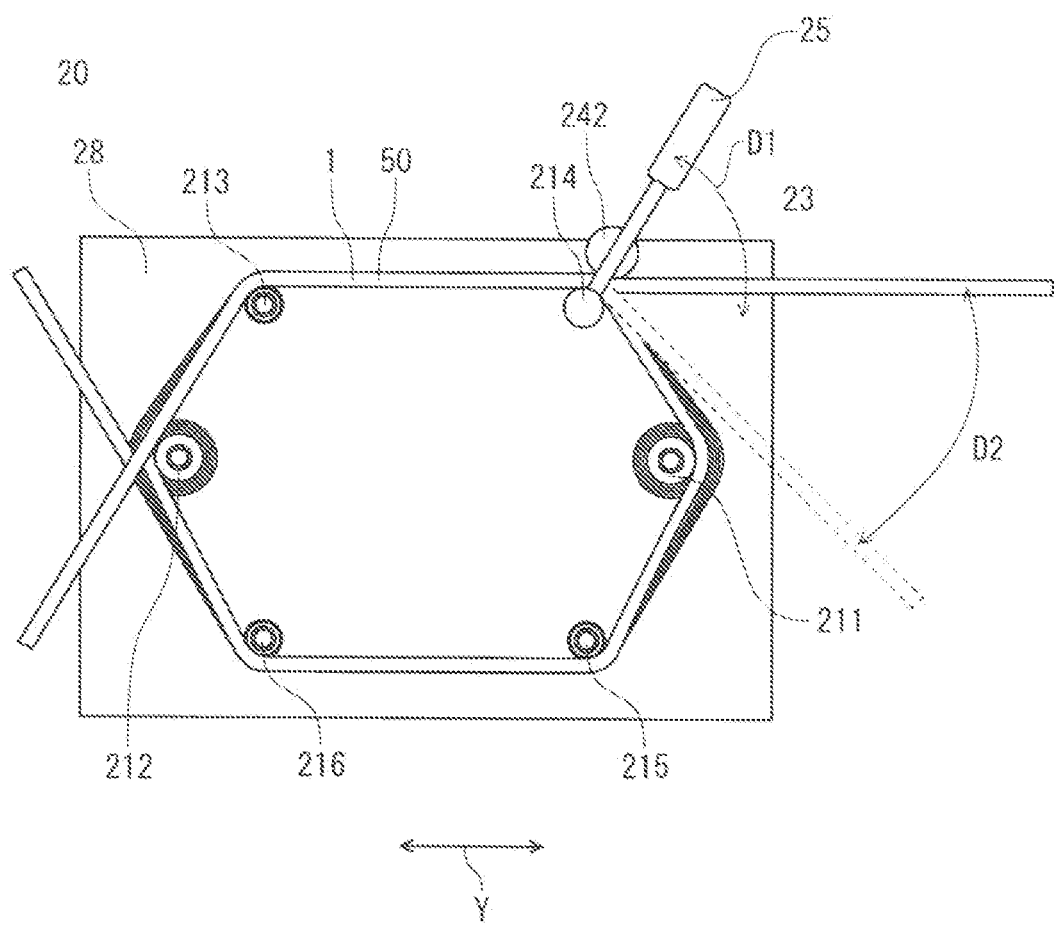
FIG. 7 is a top view showing the structure of the winding device shown in FIG. 6 for manufacturing the intermediate body of the unit coil.

FIG. 7 is a top view showing the structure of the winding device shown in FIG. 6 for manufacturing the intermediate body of the unit coil.

Figure 8:
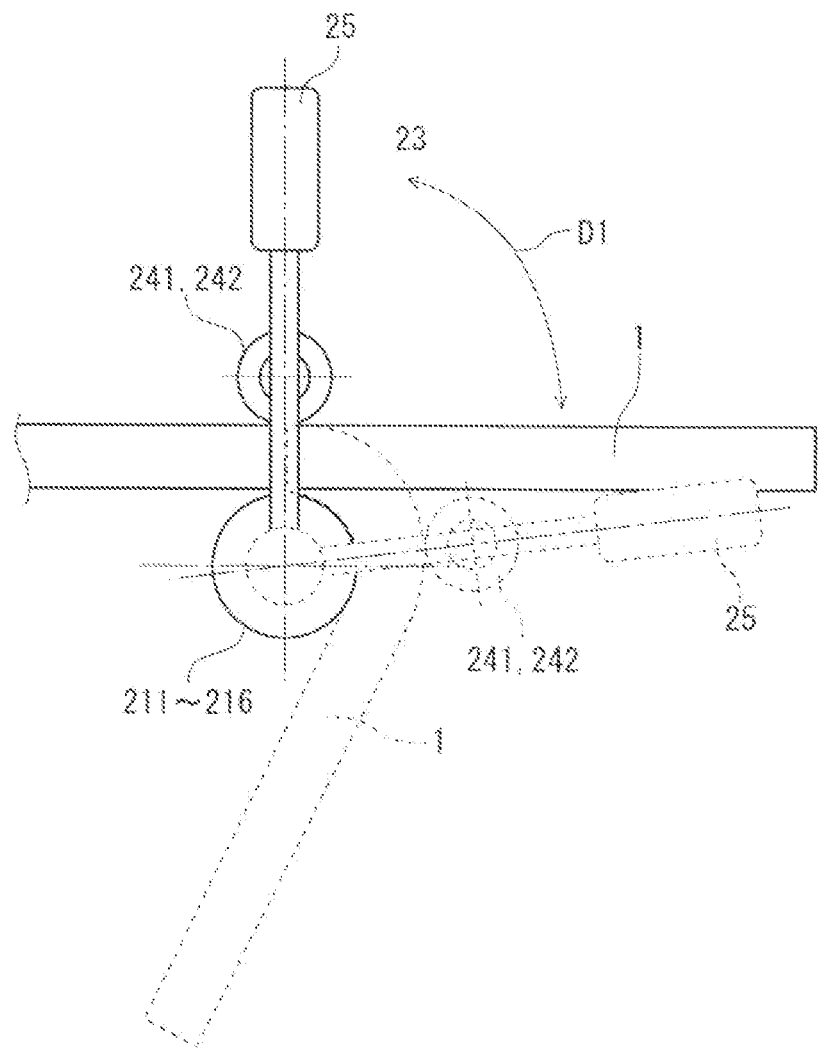
FIG. 8 is a top view illustrating how to use a winding portion of the winding device shown in FIG. 7 for manufacturing the intermediate body of the unit coil.

FIG. 8 is a top view illustrating how to use a winding portion of the winding device shown in FIG. 7 for manufacturing the intermediate body of the unit coil.

Figure 9A:
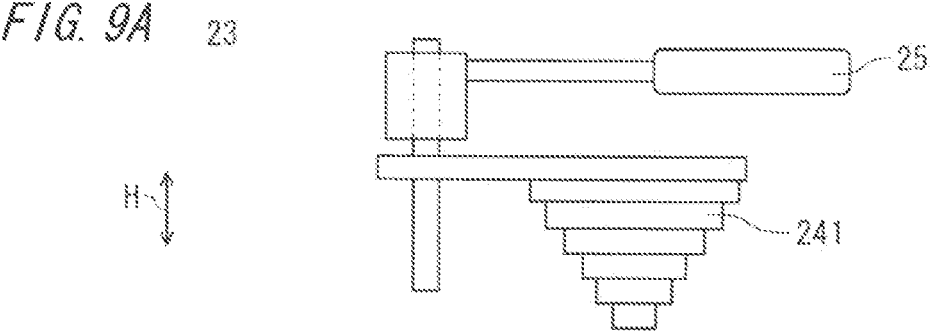
FIG. 9A is a side view showing the structure of a first guide portion of the winding portion, shown in FIG. 8, of the winding device for manufacturing the intermediate body of the unit coil.

FIG. 9A is a side view showing the structure of a first guide portion of the winding portion of the winding device, shown in FIG. 8, for manufacturing the intermediate body of the unit coil.

Figure 9B:
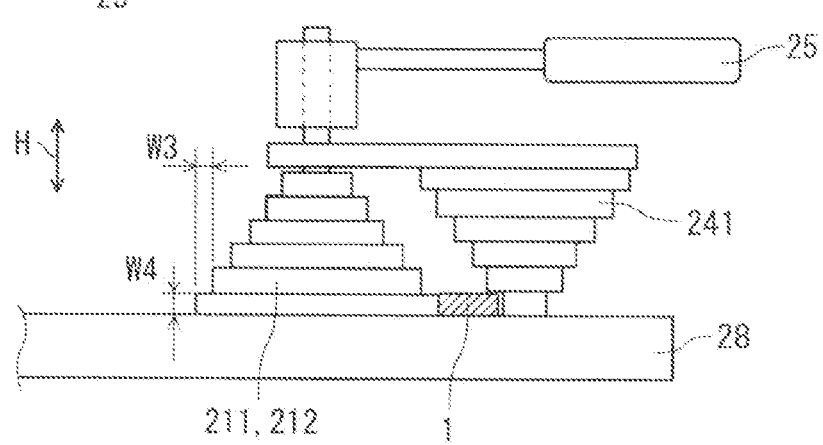
FIG. 9B is a side view illustrating how to use the first guide portion, shown in FIG. 9A, of the winding portion of the winding device for manufacturing the intermediate body of the unit coil.

FIG. 9B is a side view illustrating how to use the first guide portion, shown in FIG. 9A, of the winding portion of the winding device for manufacturing the intermediate body of the unit coil.

Figure 9C:
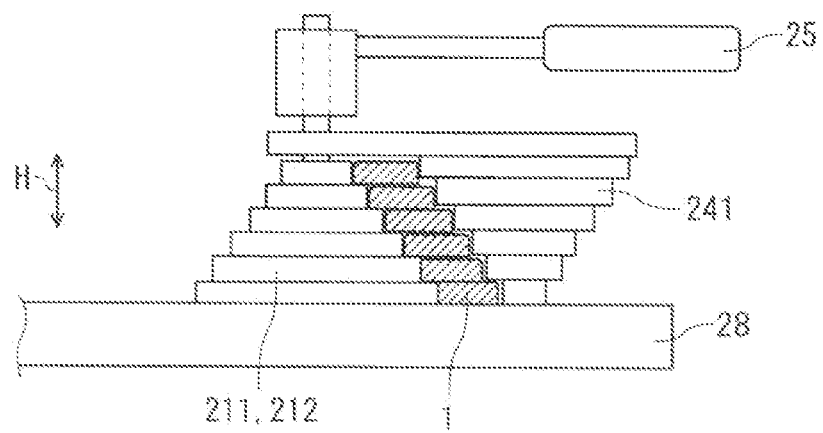
FIG. 9C is a side view illustrating how to use the first guide portion, shown in FIG. 9A, of the winding portion of the winding device for manufacturing the intermediate body of the unit coil.

FIG. 9C is a side view illustrating how to use the first guide portion, shown in FIG. 9A, of the winding portion of the winding device for manufacturing the intermediate body of the unit coil.

Figure 10A:
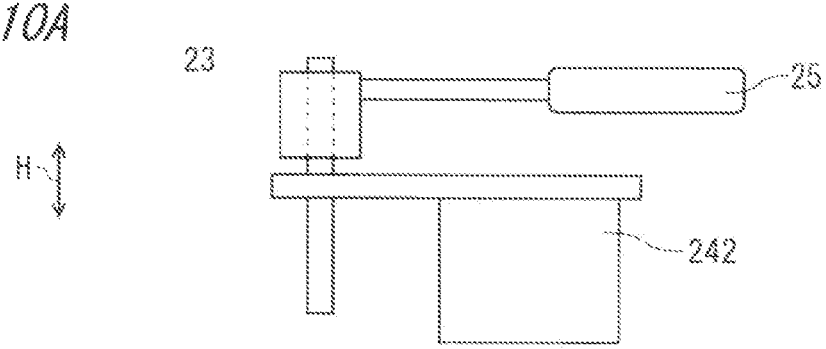
FIG. 10A is a side view showing the structure of a second guide portion of the winding portion, shown in FIG. 8, of the winding device for manufacturing the intermediate body of the unit coil.

FIG. 10A is a side view showing the structure of a second guide portion of the winding portion, shown in FIG. 8, of the winding device for manufacturing the intermediate body of the unit coil.

Figure 10B:
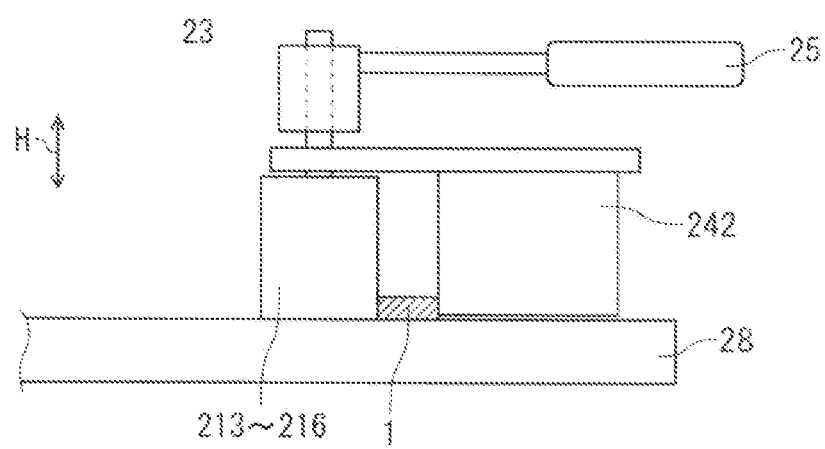
FIG. 10B is a side view illustrating how to use the second guide portion, shown in FIG. 10A, of the winding portion of the winding device for manufacturing the intermediate body of the unit coil.

FIG. 10B is a side view illustrating how to use the second guide portion, shown in FIG. 10A, of the winding portion of the winding device for manufacturing the intermediate body of the unit coil.

Figure 10C:
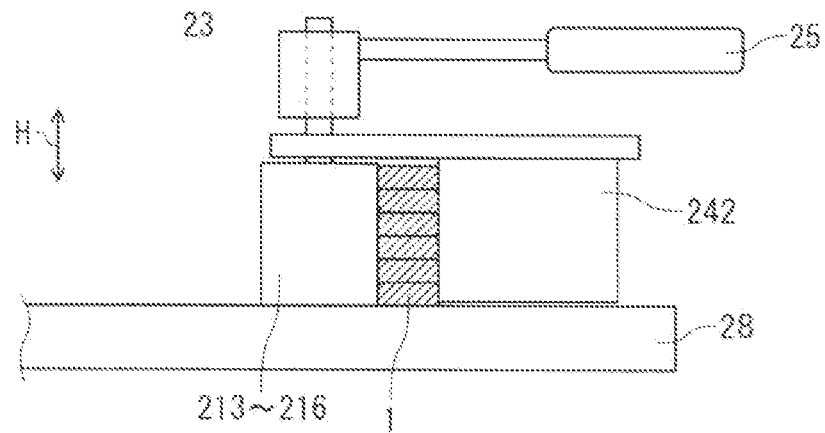
FIG. 10C is a side view illustrating how to use the second guide portion, shown in FIG. 10A, of the winding portion of the winding device for manufacturing the intermediate body of the unit coil.

FIG. 10C is a side view illustrating how to use the second guide portion, shown in FIG. 10A, of the winding portion of the winding device for manufacturing the intermediate body of the unit coil.

FIG. 11 is a perspective view showing the structure of a forming device for manufacturing the unit coil shown in FIG. 2.

Figure 12:
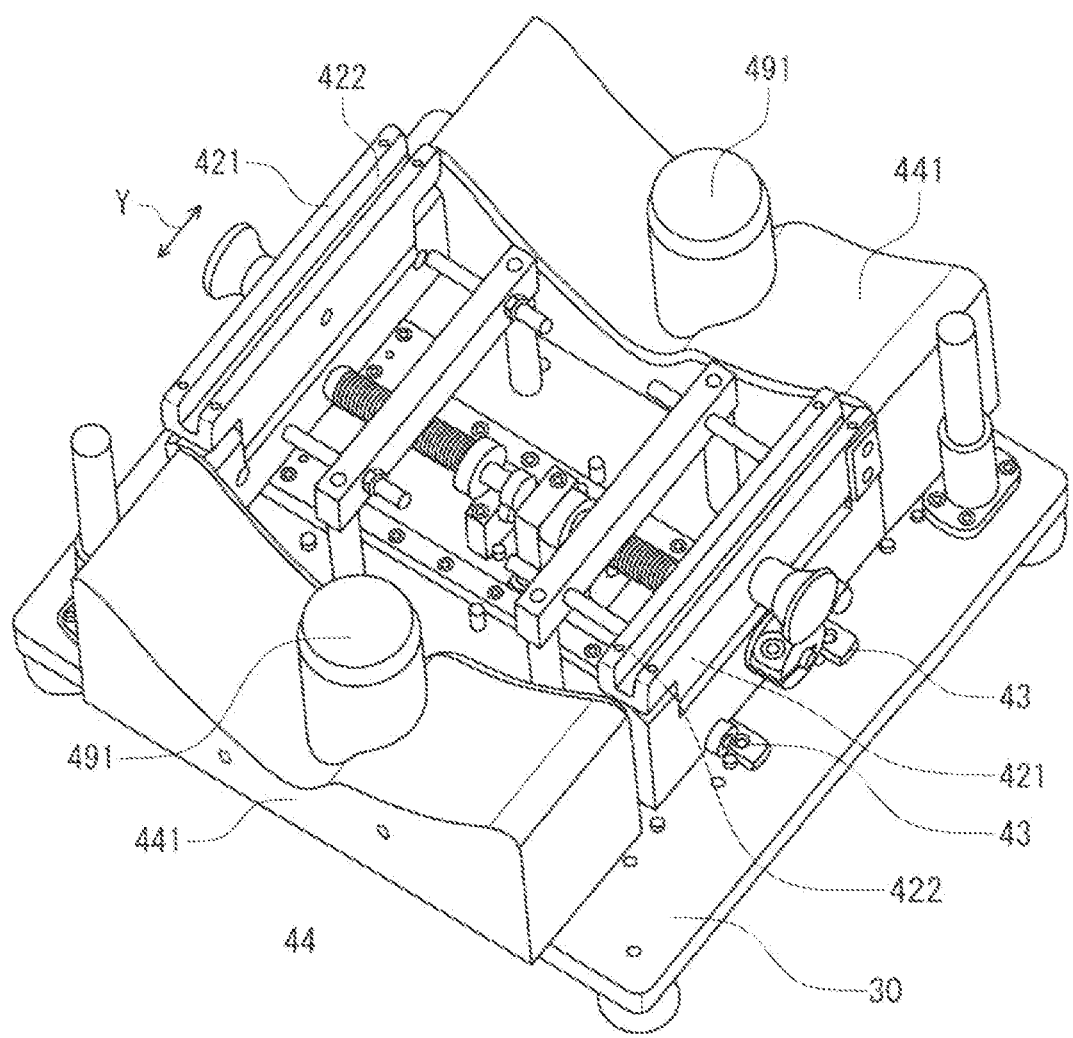
FIG. 12 is a top perspective view showing the structure of the forming device shown in FIG. 11 for manufacturing the unit coil.

FIG. 12 is a top perspective view showing the structure of a lower unit of the forming device shown in FIG. 11 for manufacturing the unit coil.

Figure 13:
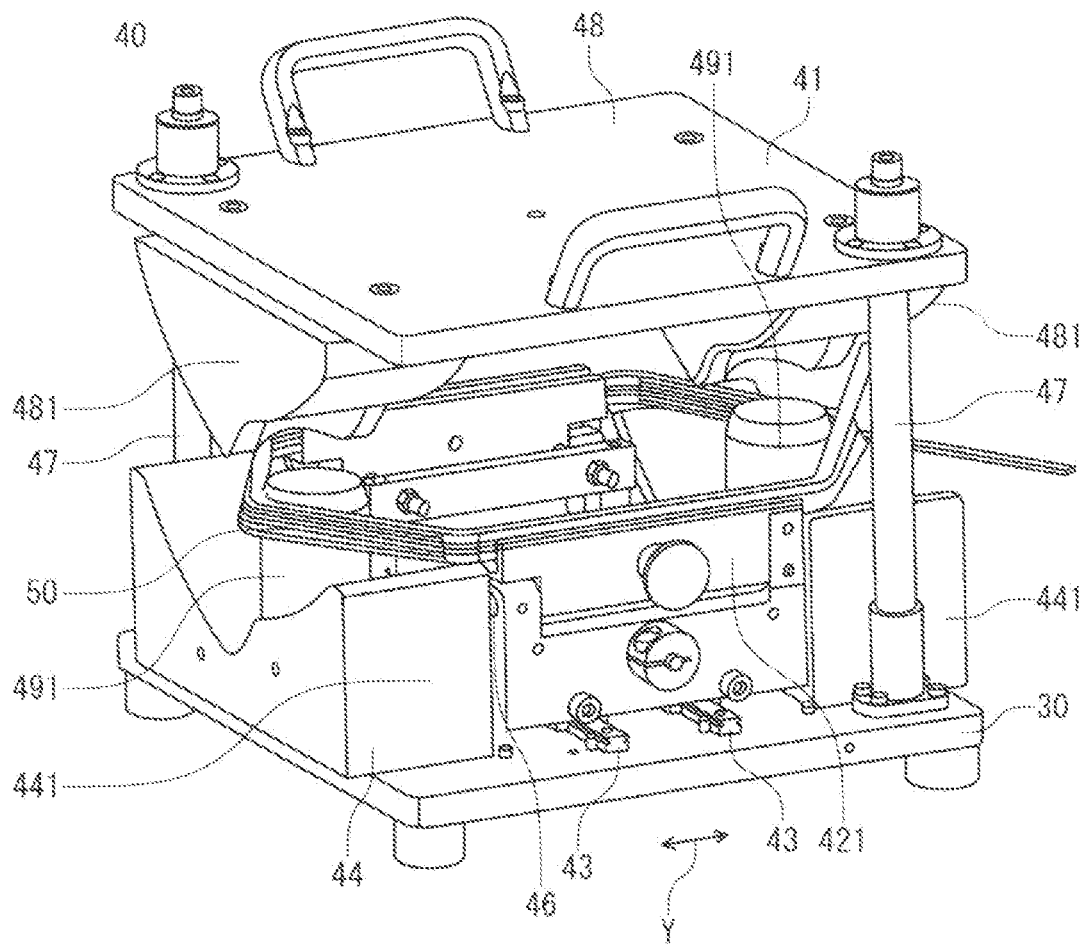
FIG. 13 is a perspective view showing a manufacturing method adopted by the forming device shown in FIG. 11 for manufacturing the unit coil.

FIG. 13 is a perspective view showing a manufacturing method adopted by the forming device shown in FIG. 11 for manufacturing the unit coil.

Figure 14:
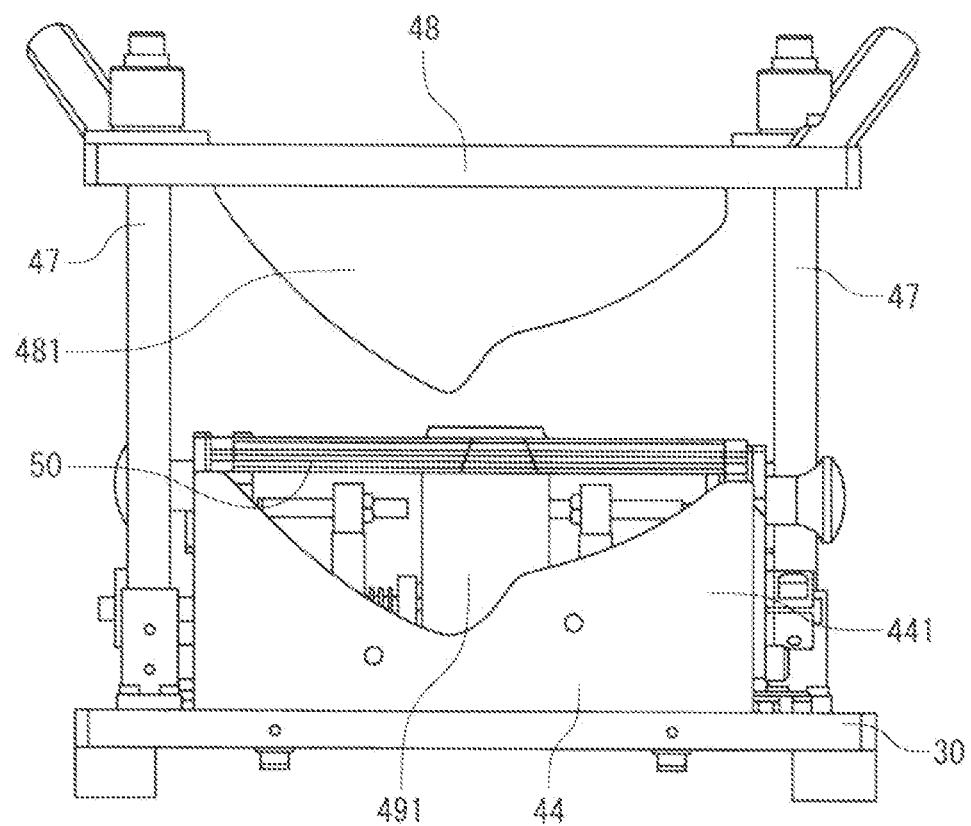
FIG. 14 is a side view showing the manufacturing method adopted by the forming device shown in FIG. 11 for manufacturing the unit coil.

FIG. 14 is a side view showing the manufacturing method adopted by the forming device shown in FIG. 11 for manufacturing the unit coil.

Figure 15:
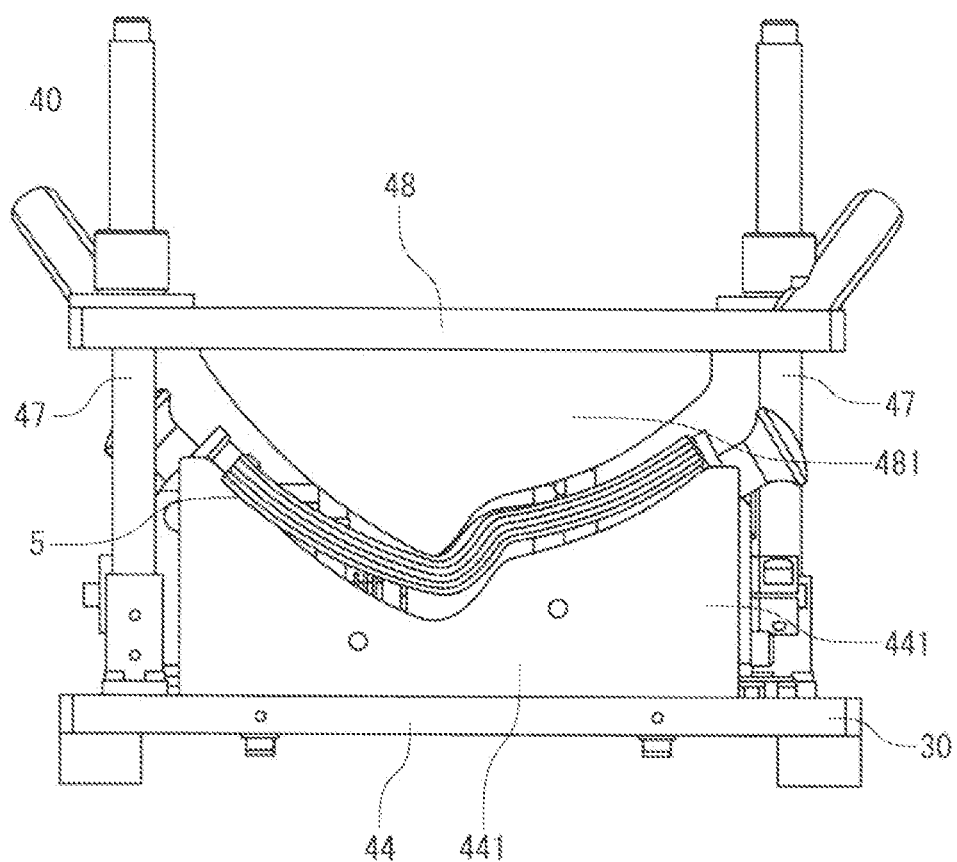
FIG. 15 is a side view showing the manufacturing method adopted by the forming device shown in FIG. 11 for manufacturing the unit coil.

FIG. 15 is a side view showing the manufacturing method adopted by the forming device shown in FIG. 11 for manufacturing a unit coil.

Figure 16A:
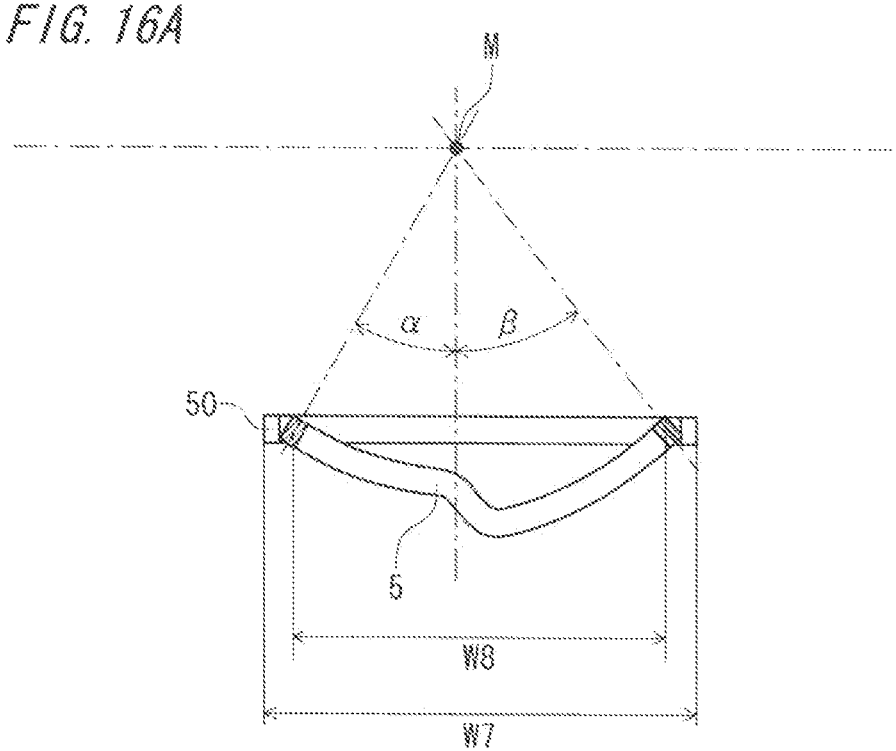
FIG. 16A is a top view for comparing the structures of the unit coil shown in FIG. 2 and the intermediate body.

FIG. 16A is a top view for comparing the structures of the unit coil shown in FIG. 2 and the intermediate body.

Figure 16B:
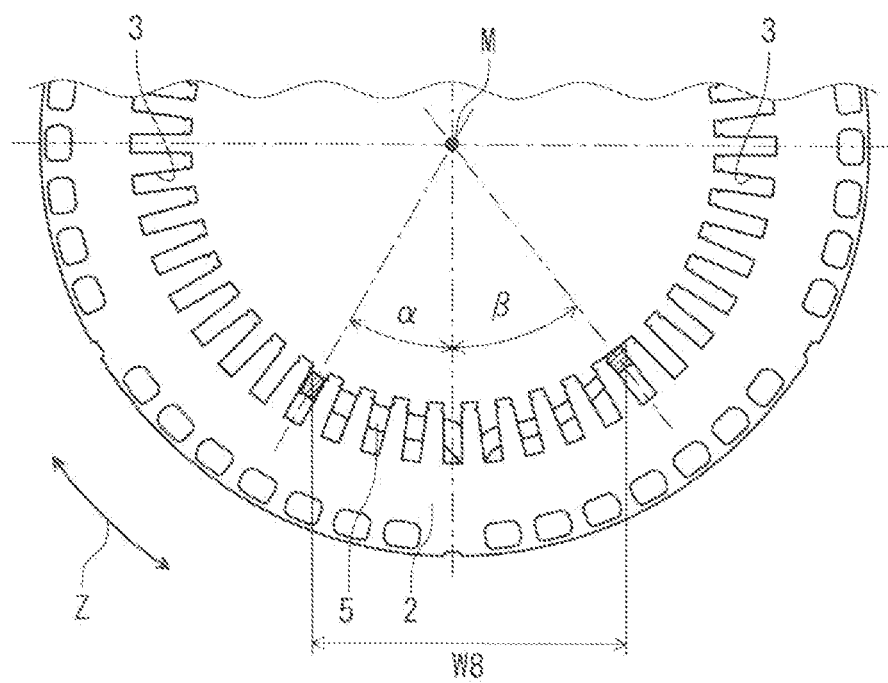
FIG. 16B is a top view showing the relationship between the unit coil shown in FIG. 16A and slots.

FIG. 16B is a top view showing the relationship between the unit coil shown in FIG. 16A and slots.

Figure 17A:
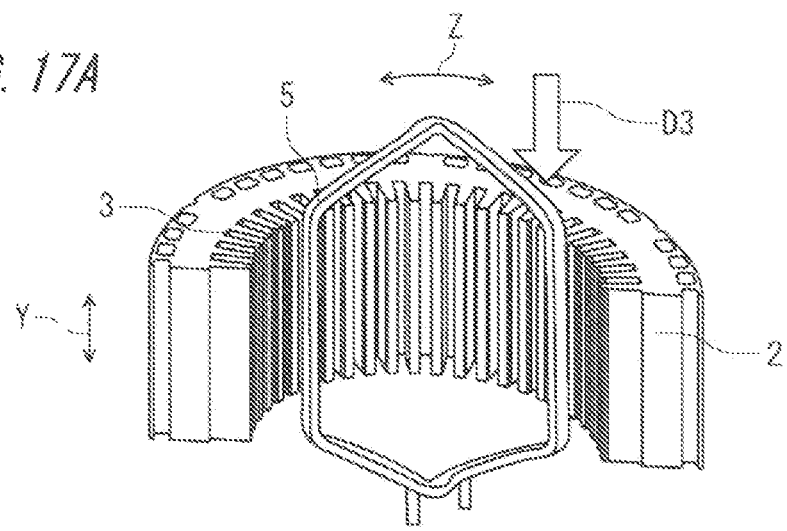
FIG. 17A is a cross-sectional perspective view showing a manufacturing method for disposing the unit coil shown in FIG. 2 in slots.

FIG. 17A is a cross-sectional perspective view showing a manufacturing method for disposing the unit coil shown in FIG. 2 in slots.

Figure 17B:
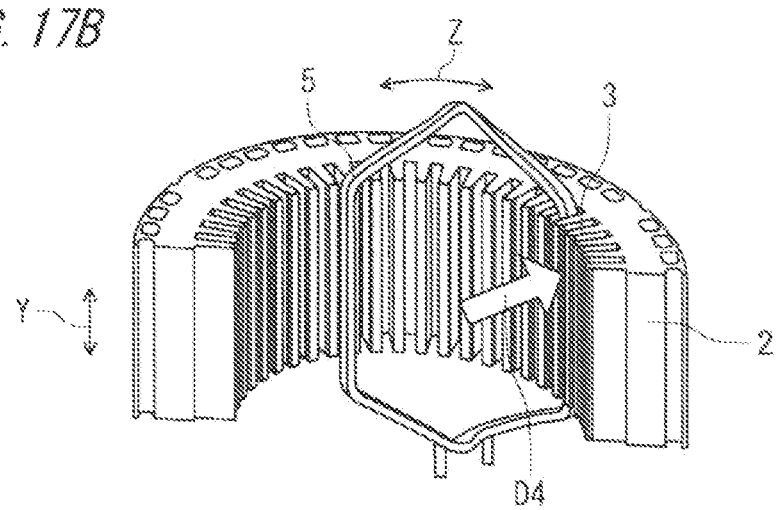
FIG. 17B is a cross-sectional perspective view showing the manufacturing method for disposing the unit coil in the slots, which follows the step of FIG. 17A.

FIG. 17B is a cross-sectional perspective view showing the manufacturing method for disposing the unit coil in the slots, which follows the step of FIG. 17A.

Figure 17C:
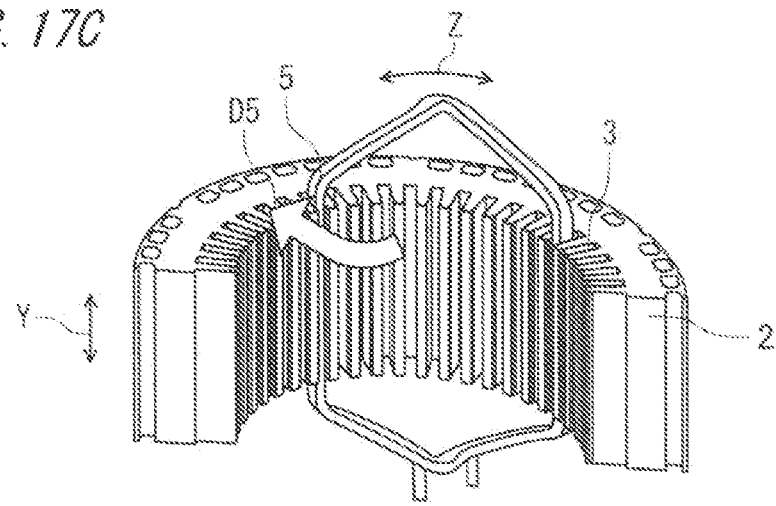
FIG. 17C is a cross-sectional perspective view showing the manufacturing method for disposing the unit coil in the slots, which follows the step of FIG. 17B.

FIG. 17C is a cross-sectional perspective view showing the manufacturing method for disposing the unit coil in the slots, which follows the step of FIG. 17B.

Figure 18A:
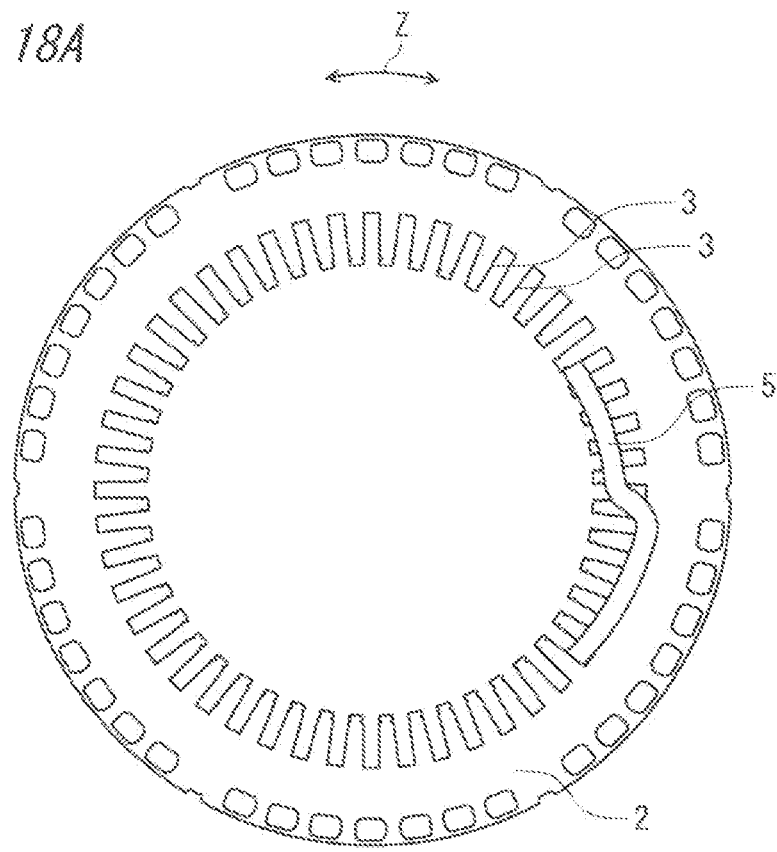
FIG. 18A is a top view showing the state in which one unit coil shown in FIG. 17C is disposed in the slots.

FIG. 18A is a top view showing the state in which one unit coil shown in FIG. 17C is disposed in the slots.

Figure 18B:
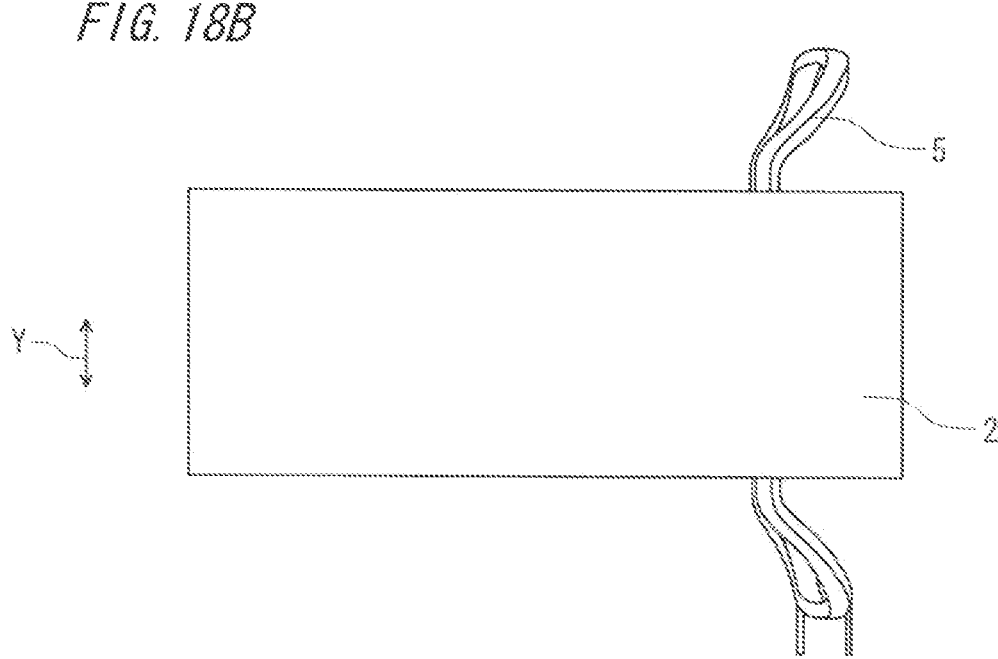
FIG. 18B is a side view showing the state in which the one unit coil shown in FIG. 17C is disposed in the slots.

FIG. 18B is a side view showing the state in which one unit coil shown in FIG. 17C is disposed in the slots.

Figure 19A:
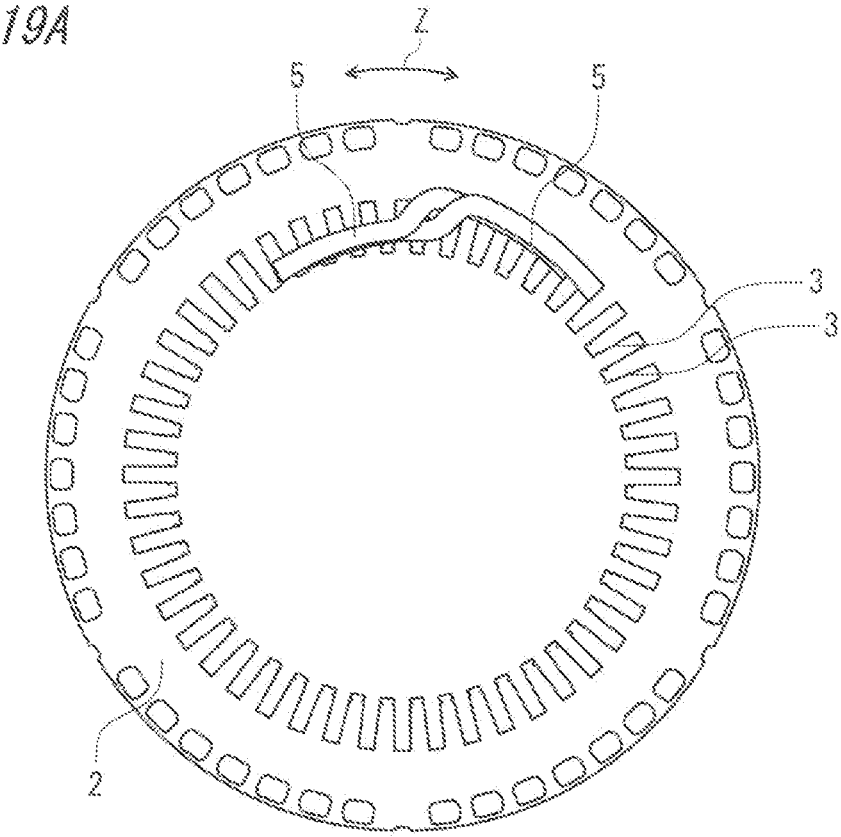
FIG. 19A is a top view showing the state in which another unit coil is disposed in slots from the state shown in FIG. 18A.

FIG. 19A is a top view showing the state in which another unit coil is disposed in slots from the state shown in FIG. 18A.

Figure 19B:
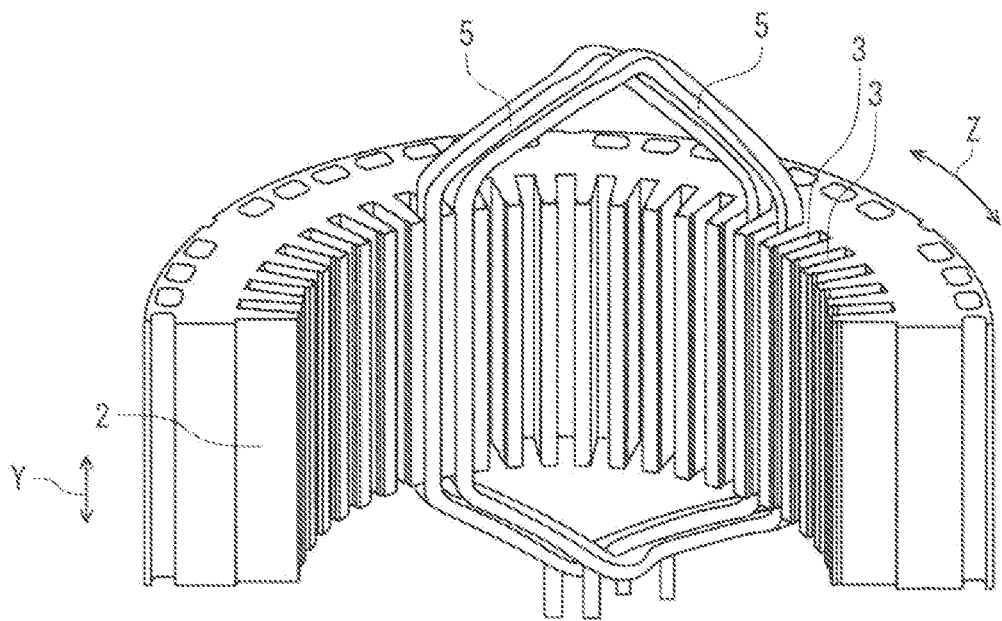
FIG. 19B is a cross-sectional perspective view showing the state in which two unit coils are disposed as shown in FIG. 19A.

FIG. 19B is a cross-sectional perspective view showing the state in which two unit coils are disposed as shown in FIG. 19A.

Figure 20A:
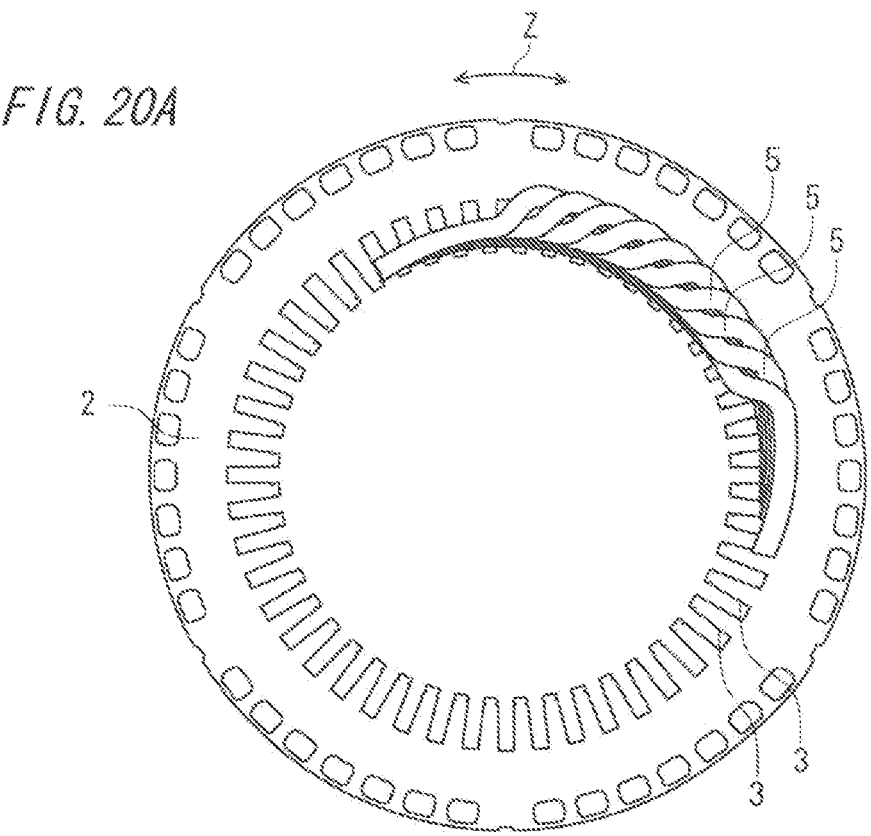
FIG. 20A is a top view showing the state in which a plurality of unit coils are further disposed in slots from the state shown in FIG. 19A.

FIG. 20A is a top view showing the state in which a plurality of unit coils are further disposed in slots from the state shown in FIG. 19A.

Figure 20B:
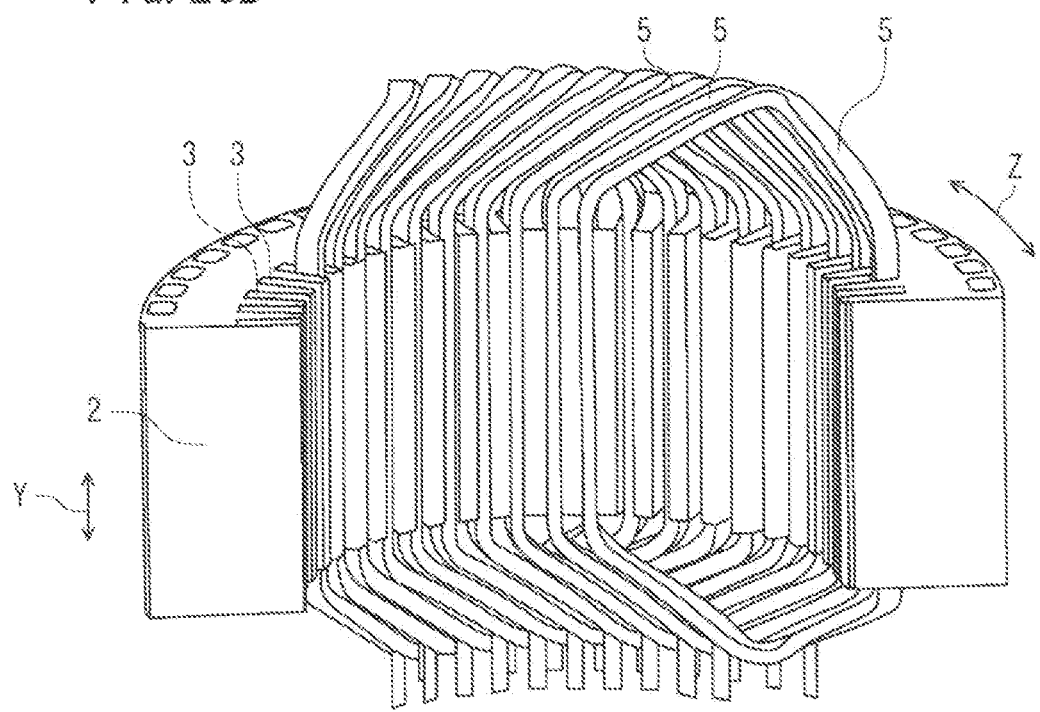
FIG. 20B is a cross-sectional perspective view showing the state in which the plurality of unit coils are disposed as shown in FIG. 20A.

FIG. 20B is a cross-sectional perspective view showing the state in which the plurality of unit coils are disposed as shown in FIG. 20A.

FIG. 21 is a diagram for describing an interval between two unit coils, shown in FIG. 2, arranged in an annular shape.

Figure 22A:
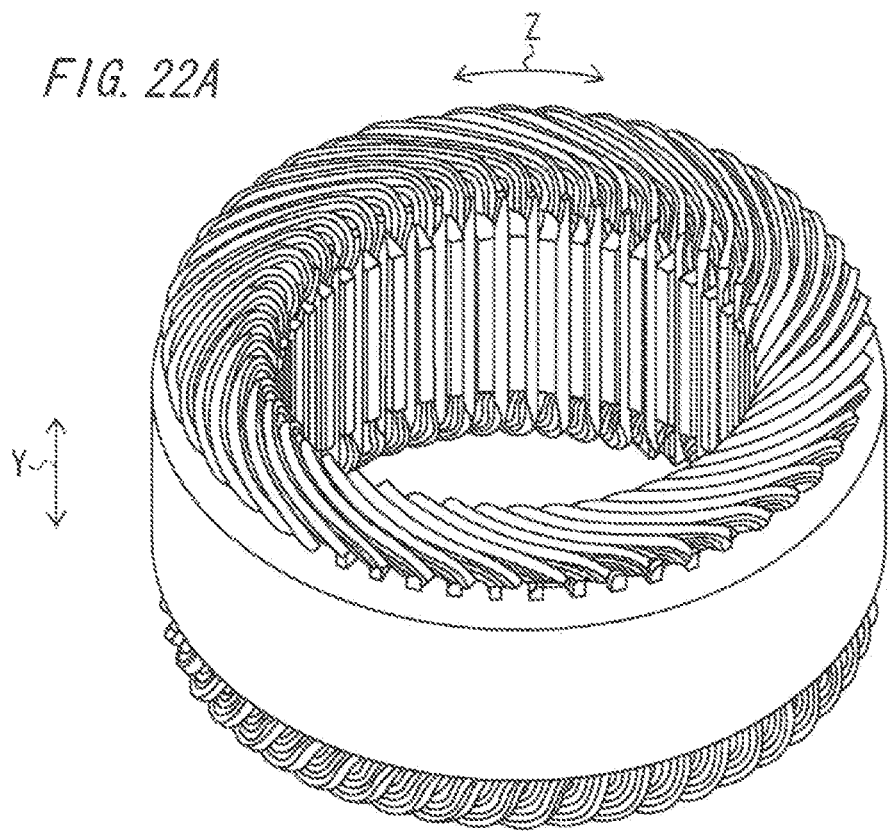
FIG. 22A is a perspective view showing the structure of a stator of a rotary electric machine according to a comparative example.

FIG. 22A is a perspective view showing the structure of a stator of a rotary electric machine according to a comparative example.

Figure 22B:
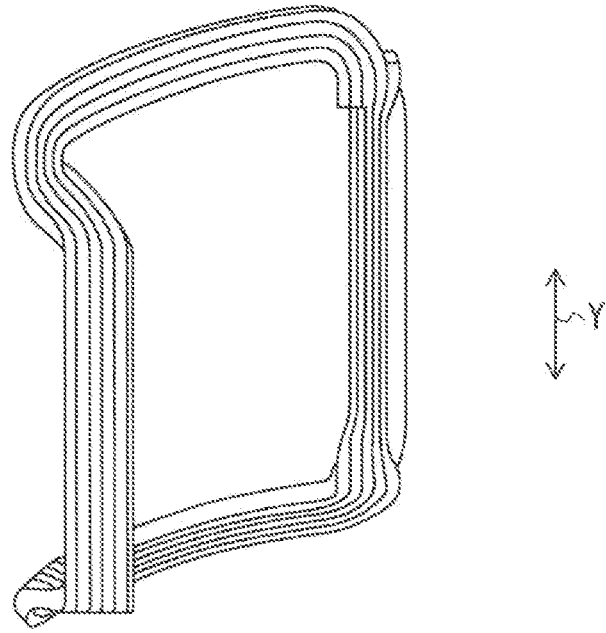
FIG. 22B is a perspective view showing the structure of a unit coil after being inserted in a stator core of the stator according to the comparative example shown in FIG. 22A.

FIG. 22B is a perspective view showing the structure of a unit coil after being inserted in a stator core of the stator according to the comparative example shown in FIG. 22A.

Figure 23A:
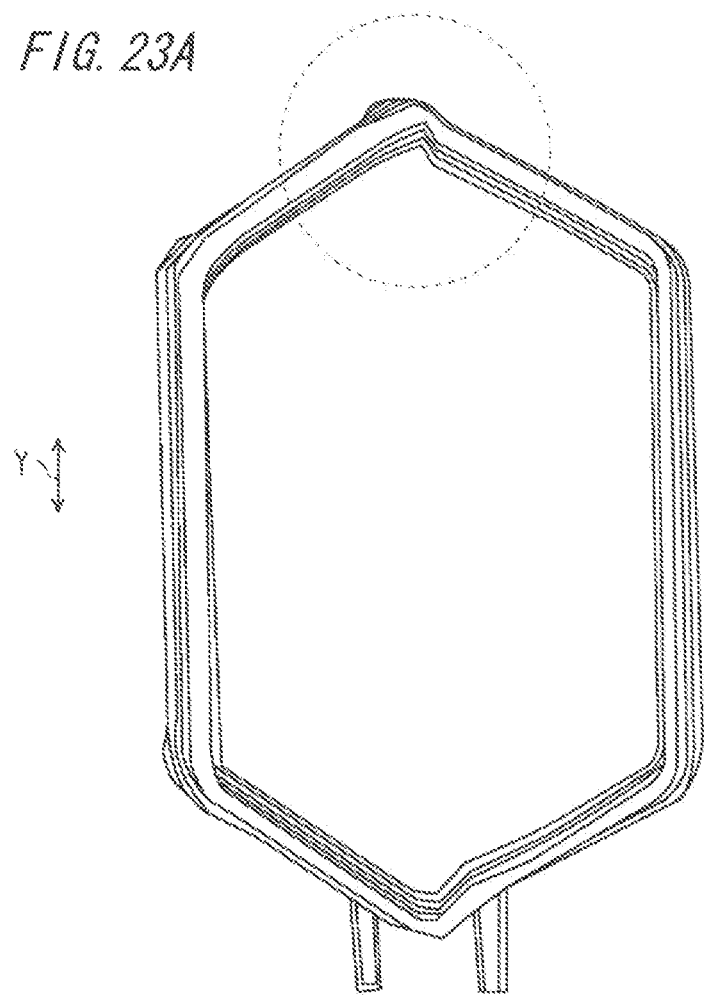
FIG. 23A is a front view showing the structure of a unit coil before being inserted in the stator core according to the comparative example shown in FIG. 22.

FIG. 23A is a front view showing the structure of a unit coil before being inserted in the stator core according to the comparative example shown in FIG. 22.

Figure 23B:
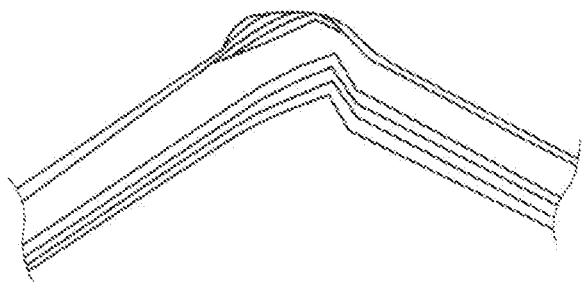
FIG. 23B is a partially enlarged view showing the structure of a part, surrounded by a dotted line circle, of the unit coil shown in FIG. 23A.

FIG. 23B is a partially enlarged view showing the structure of a part, surrounded by a dotted line circle, of the unit coil shown in FIG. 23A.

FIG. 24A is a top view showing the structure of an intermediate body of the unit coil shown in FIG. 23A.

FIG. 24B is a front view showing the structure of the intermediate body of the unit coil shown in FIG. 23A.

FIG. 24C is a side view showing the structure of the intermediate body of the unit coil shown in FIG. 22A.

FIG. 25 is a perspective view showing a manufacturing method for the intermediate body of the unit coil shown in FIG. 22.

Figure 26:
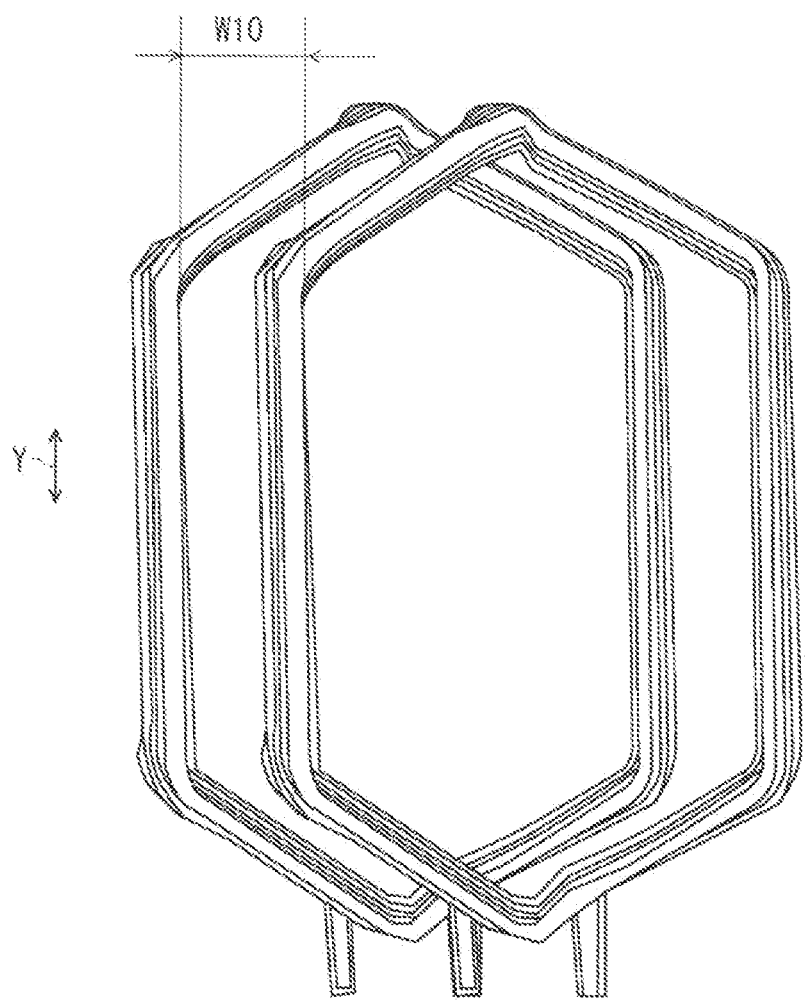
FIG. 26 is a diagram for describing an interval between two unit coils, shown in FIG. 23, arranged in an annular shape.

FIG. 26 is a diagram for describing an interval between two unit coils, shown in FIG. 23, arranged in an annular shape.

In the following description, directions in a stator 10 of a rotary electric machine are defined as a circumferential direction Z and an axial direction Y. In addition, a direction in which a conductive wire 1 forming a unit coil 5 is stacked in layers is defined as a stacking direction H. Therefore, also in other portions, directions will be indicated and described using the above directions as references.

In FIG. 1A, the stator 10 of an inner rotor type rotary electric machine is composed of a stator core 2 and a stator coil 4. The stator core 2 is formed in an annular shape, and has, on an inner circumferential side, a plurality of slots 3 arranged at predetermined intervals in the circumferential direction Z. The stator coil 4 is, for example, a distributed winding type three-phase coil having 2 poles and 48 slots, and is formed of a plurality of unit coils 5 arranged in an annular shape. Each unit coil 5 is inserted and disposed in predetermined slots 3. Note that the number of the poles of the stator 10 and the number of the slots 3 in embodiment 1 are merely examples, and can be increased/decreased as appropriate.

Next, the structure of the unit coil 5 will be described with reference to FIG. 1B and FIG. 2. The unit coil 5 is formed in an annular shape. The unit coil 5 includes: accommodation portions 6 to be accommodated in predetermined two slots 3 among the respective slots 3; a coil end portion 71 and a coil end portion 72 connecting both ends, in the axial direction Y of the rotary electric machine, of each accommodation portion 6; and connection portions 8 which are both ends of the unit coil 5, and electrically connect the unit coil 5 to other portions.

As shown in FIG. 3, a conductive wire 1 for forming the unit coil 5 is a rectangular conductive wire having a rectangular cross section. The conductive wire 1 is formed by coating a conductor 11 with an insulating film 12. As for dimensions of the conductive wire 1, a vertical dimension W1 (thickness W1) in the stacking direction H is 2.0 mm and a horizontal dimension W2 is 8.7 mm, and thus the conductive wire 1 has a large aspect ratio. Note that the dimensions are merely examples, and the values thereof are used for facilitating the understanding.

Next, an intermediate body 50, of the unit coil 5, which is an unfinished state in forming the unit coil 5, will be described with reference to FIG. 4 and FIG. 5. Hereinafter, the intermediate body 50 of the unit coil 5 may be referred to as "intermediate body". The intermediate body 50 is obtained by winding the conductive wire 1 a plurality of times into an annular shape to stack the conductive wire 1 in a plurality of layers in the stacking direction H. Here, the intermediate body 50 is formed in a hexagonal annular shape. Like the unit coil 5, the intermediate body 50 also has: accommodation portions 6 to be accommodated in predetermined two slots 3 among the slots 3; coil end portions 71, 72 connecting both ends, in the axial direction Y of the rotary electric machine, of each accommodation portion 6; and connection portions 8 which are both ends of the intermediate body 50.

Each of the coil end portions 71, 72 of the intermediate body 50 is stacked in layers so as to have a stair-like outer shape in the stacking direction H (see FIG. 5B, FIG. 5C, and FIG. 5D). Since the coil end portions 71, 72 are stacked stepwise, lengths W5 and W6 in the axial direction Y between the coil end portions 71 and 72 are set such that the length W6 at one side in the stacking direction H is larger (longer) than the length W5 at the other side in the stacking direction H.

A length T, of each of the coil end portions 71, 72, from one accommodation portion 6 to the other accommodation portion 6, is longer in a layer on the side to be bent in a direction away from the positions of the accommodation portions 6 (here, the one side in the stacking direction H (side having the length W6)) than in a layer on the side closer to the positions of the accommodation portions 6 (here, the other side in the stacking direction H (side having the length W5)).

Each of the accommodation portions 6 of the intermediate body 50 is stacked in layers so as to have a linear outer shape in the stacking direction H.

In other words, the intermediate body 50 is obtained by deforming the unit coil 5 such that the positions of the coil end portions 71, 72 coincide with the positions of the accommodation portions 6 in the stacking direction H.

A device for manufacturing the unit coil 5 by use of the conductive wire 1 will be described with reference to the drawings. First, a winding device 20, which is a manufacturing device used for a winding step of forming the intermediate body 50 of the unit coil 5, will be described with reference to FIG. 6 through FIG. 10. In order to form the intermediate body 50 by winding the conductive wire 1, edgewise bending of the conductive wire 1, i.e., bending the conductive wire 1 in a direction in which a plane including a short side of the rectangular cross section thereof can be bent, is required, and therefore, the special winding device 20 is needed.

The winding device 20 includes: a base plate 28; a first shaft member 211 and a second shaft member 212 each being cylindrical and having a stair-like outer shape, disposed on the base plate 28 at both ends, in the axial direction Y, of formation positions of the coil end portions 71, 72 of the intermediate body 50; and a third shaft member 213, a fourth shaft member 214, a fifth shaft member 215, and a sixth shaft member 216 each being cylindrical and having a linear outer shape, disposed on the base plate 28 at both ends, in the axial direction Y, of formation positions of the accommodation portions 6 of the intermediate body 50. The first shaft member 211, the second shaft member 212, the third shaft member 213, the fourth shaft member 214, the fifth shaft member 215, and the sixth shaft member 216 are located at the vertices of a hexagon, which enables formation of the intermediate body 50 having a hexagonal annular shape.

The stair-like outer shape of each of the first shaft member 211 and the second shaft member 212 has, as shown in FIG. 9B, a width W4 in the stacking direction H being equal to the vertical dimension W1 (2.0 mm) of the conductive wire 1, and a width W3 of each step (step amount W3) having a value, at maximum, ½ of the vertical dimension W1 (1.0 mm) of the conductive wire 1. The winding device 20 further includes a winding portion 23 which causes the conductive wire 1 to be wound along the outer shapes of the first shaft member 211, the second shaft member 212, the third shaft member 213, the fourth shaft member 214, the fifth shaft member 215, and the sixth shaft member 216.

As shown in FIG. 9, the winding portion 23 includes a first guide portion 241 having an inverted-stair-like outer shape to which the stair-like outer shape of each of the first shaft member 211 and the second shaft member 212 fits, with the conductive wire 1 being placed along the stair-like outer shape. As shown in FIG. 10, the winding portion 23 includes a second guide portion 242 having a linear shape to which the linear outer shape of each of the third shaft member 213, the fourth shaft member 214, the fifth shaft member 215, and the sixth shaft member 216 fits, with the conductive wire 1 being placed along the linear outer shape.

Furthermore, as shown in FIG. 8, the winding portion 23 includes a handle 25 which causes the first guide portion 241 or the second guide portion 242 to rotate around each of the shaft members 211 to 216, in order to bend the conductive wire 1 while being disposed between the first guide portion 241 and the first shaft member 211 or the second shaft member 212 or in order to bend the conductive wire 1 while being disposed between the second guide portion 242 and the third shaft member 213, the fourth shaft member 214, the fifth shaft member 215, or the sixth shaft member 216.

Next, a description will be given of, with reference to FIG. 11 and FIG. 12, a forming device 40 which is a manufacturing device used for a forming step of forming an intermediate body 50 into a unit coil 5 having a shape suitable to be accommodated in predetermined slots 3, i.e., a forming step from the state of the intermediate body 50 shown in FIG. 5 to the state of the unit coil 5 shown in FIG. 2. The forming device 40 includes an upper unit 48, a lower unit 44 placed on a placement table 30, and guide bars 47 for guiding the upper unit 48 vertically so as to be separable and connectable with respect to the lower unit 44.

A pair of guide bars 47 are disposed at corners on a diagonal line of the placement table 30. The lower unit 44 includes a pair of first holding portions 421, slide portions 43, rotary shafts 46, a pair of lower dies 441, and a pair of second holding portions 491 (see FIG. 12). The pair of first holding portions 421 have grooves 422 for holding the accommodation portions 6 of the intermediate body 50. The pair of second holding portions 491 hold both ends, in the axial direction Y, of the coil end portions 71, 72 of the intermediate body 50. The slide portions 43 cause the pair of first holding portions 421 to slide in parallel on the placement table 30 so that the portions 421 can independently approach each other.

The sliding direction of the slide portions 43 and the extending direction of the grooves 422 are orthogonal to each other. The rotary shafts 46 cause the respective first holding portions 421 to rotate independently from each other in a direction orthogonal to the axial direction Y, so that the grooves 422 rotate around the corresponding rotary shafts 46. The pair of lower dies 441 are used for shaping of the coil end portions 71, 72 of the intermediate body 50. The pair of lower dies 441 are disposed on the placement table 30, in parallel to the slide portions 43, with the slide portions 43 interposed therebetween.

The upper unit 48 includes: a planar movable plate 41; and a pair of upper dies 481 that are mounted to the lower surface of the movable plate 41 and are used, together with the pair of lower dies 441, for forming the coil end portions 71, 72 of the intermediate body 50. The lower surfaces of the pair of upper dies 481 project downward so as to fit in recesses at the upper surfaces of the pair of lower dies 441. The movable plate 41 moves in the up-down direction with respect to the placement table 30 while being guided by the guide bars 47.

Next, a description will be given of a method for manufacturing a unit coil 5, using the device for manufacturing a unit coil 5 for the stator of the rotary electric machine of embodiment 1 described above. Firstly, a winding step, which is a method for manufacturing an intermediate body 50 of the unit coil 5, will be described. The conductive wire 1 is wound along the outer shapes of the first shaft member 211, the second shaft member 212, the third shaft member 213, the fourth shaft member 214, the fifth shaft member 215, and the sixth shaft member 216 on the base plate 28 of the winding device 20.

At this time, the conductive wire 1 is sandwiched between the outer shape of each of the shaft members 211 to 216 and the outer shape of the first guide portion 241 or the second guide portion 242 of the winding portion 23. Then, as shown in FIG. 7 or FIG. 8, the handle 25 is rotated around the shaft by a predetermined angle in a direction of an arrow D1. Then, the conductive wire 1 is bent in a direction of an arrow D2 and wound along the outer shapes of the first shaft member 211 to the sixth shaft member 216. Thus, the conductive wire 1 is bent in a desired shape.

At this time, since the first shaft member 211 and the second shaft member 212 each have the stair-like outer shape, the conductive wire 1 is stacked in layers so as to have a stair-like shape in the stacking direction H as shown in FIG. 9 while being held by the first guide portion 241. Thus, the coil end portions 71, 72 of the intermediate body 50 are formed so as to have a stair-like outer shape. Meanwhile, since the third to sixth shaft members 213 to 216 each have the linear outer shape, the conductive wire 1 is stacked in layers so as to have a linear shape in the stacking direction H as shown in FIG. 10 while being held by the second guide portion 242. Thus, the accommodation portions 6 of the intermediate body 50 are formed so as to have a linear outer shape.

In this winding step, each of the coil end portions 71, 72 of the intermediate body 50 has the stair-like shape, and is stacked in layers with the width W of each step being shifted by 1.0 mm. The reason is as follows. The value of 1.0 mm is estimated from an amount of deviation that will occur in the following forming step. If the conductive wire is wound with a step difference of 1.0 mm given, for each stacked layer, to each of the coil end portions 71, 72 of the intermediate body 50, the coil end portions 71, 72 can be formed to be aligned in the axial direction Y without deviation when each of the coil end portions 71, 72 is bent and formed in a stereoscopic wave shape in the following forming step.

That is, estimating an amount of deviation that will occur for each stacked layer in the forming step, the widths W5 and W6 in the axial direction Y between the coil end portions 71, 72 are made different from each other in the winding step. Thus, when the unit coil 5 is mounted in predetermined slots 3 of the stator core 2, interference between the coil end portions 71 (72) of adjacent unit coils 5 in the circumferential direction Z is avoided, thereby achieving ideal arrangement of unit coils 5. The aforementioned winding step is repeated for 6 turns (stacking of 6 layers) to complete the substantially hexagonal intermediate body 50.

When the winding step of the conductive wire 1 has finished, the intermediate body 50 is removed from the winding device 20 as shown in FIG. 5. Next, a step of forming the intermediate body 50 shown in FIG. 5 into the unit coil 5 shown in FIG. 2 is performed. Firstly, the intermediate body 50 is placed on the lower unit 44 of the forming device 40 shown in FIG. 12, and the upper unit 48 is set as shown in FIG. 13 and FIG. 14. At this time, the intermediate body 50 is set such that the side, having the larger width W6 in the axial direction Y between the both coil end portions 71, 72 of the unit coil 5, faces downward. Next, the movable plate 41 is moved downward while being guided by the guide bars 47, and the coil end portions 71, 72 of the intermediate body 50 are sandwiched and pressed between the pair of lower dies 441 of the lower unit 44 and the pair of upper dies 481 of the upper unit 48, thereby forming the intermediate body 50 into the unit coil 5 (FIG. 15).

Therefore, the coil end portions 71, 72 of the intermediate body 50 are bent such that, in a layer having the large length W6 in the axial direction Y between the coil end portions 71, 72, the positions of the coil end portions 71, 72 projecting furthest from the accommodation portions 6 in the axial direction Y move away from the positions of the accommodation portions 6 in the stacking direction H, compared to the state in the winding step. At this time, the stacked layers of the conductive wire 1 of the coil end portions 71, 72 are restricted by the pair of second holding portions 491 so as not to deviate toward the center in the axial direction Y. Thus, the positions, in the axial direction Y, of the coil end portions 71, 72 on the inner side of the annular shape are aligned for each stacked layer (FIG. 2D).

When the coil end portions 71, 72 of the intermediate body 50 are deformed from the planar shape to the stereoscopic wave shape of the unit coil 5, the interval between the two accommodation portions 6 of the intermediate body 50 is narrowed and the angle of each accommodation portion 6 is changed while the pair of first holding portions 421 are gradually moved in parallel by the slide portions 43 and are rotated around the rotary shafts 46 as the upper unit 48 moves downward. Then, the intermediate body 50 is formed such that the interval of the accommodation portions 6 thereof becomes equal to the interval of the predetermined two slots 3 in which the accommodation portions 6 will be inserted, and such that an angle α and an angle β from a center point M, in the circumferential direction Z, of the accommodation portions 6 of the intermediate body 50, i.e., a center point M, in the circumferential direction Z, of the stator 10, become equal to an angle α and an angle β from a center point M, in the circumferential direction Z, of the predetermined two slots 3, respectively.

Specifically, as shown in FIG. 16, the pair of first holding portions 421 are moved in parallel such that an interval W8 of the accommodation portions 6 of the unit coil 5 becomes shorter than an interval W7 of the accommodation portions 6 of the intermediate body 50. Furthermore, the pair of first holding portions 421 are rotated around the rotary shafts 46 such that the angles α and β of the accommodation portions 6 of the intermediate body 50 become equal to the angles α and β (i.e., insertion angles) of the predetermined slots 3. When formation of the unit coil 5 has been completed, the movable plate 41 of the upper unit 48 is moved upward while being guided by the guide bars 47, and the unit coil 5 is removed from the pair of first holding portions 421.

Next, a method for manufacturing the stator 10 of the rotary electric machine by use of the unit coil 5, will be described with reference to FIG. 17 through FIG. 20. Since a three-phase rotary electric machine having 48 slots 3 is described here, 48 unit coils 5 are successively accommodated in the stator core 2 across 9 teeth. Next, as for insertion of each unit coil 5 into the stator core 2, since the angles α and β of the accommodation portions 6 of the unit coil 5 are equal to the angles α and β for insertion into the predetermined slots 3 as described above, the unit coil 5 is inserted, in a direction of an arrow D3 in the axial direction Y, to the inside of the stator core 2 as shown in FIG. 17A.

Next, as shown in FIG. 17B, one of the accommodation portions 6 of the unit coil 5 is accommodated in the predetermined slot 3 in a direction of an arrow D4. Next, as shown in FIG. 17C, the other accommodation portion 6 is accommodated in the slot 3 that is 10 slots away in the circumferential direction Z from the slot 3 in which the one accommodation portion 6 has already been accommodated. At this time, the other accommodation portion 6 is accommodated in the slot 3 while the unit coil 5 is rotated in a direction of an arrow D5 shown in FIG. 17C around the slot 3 in which the accommodation portion 6 has already been accommodated, with the interval between the two slots 3 being slightly increased in the circumferential direction Z within a range of an elastic deformation amount of the unit coil 5. Thus, accommodation of one unit coil 5 in the stator core 2 is completed (FIG. 18A, FIG. 18B).

Similarly, accommodation of a second unit coil 5 is performed (FIG. 19A, FIG. 19B). Furthermore, a similar operation is repeated to accommodate a tenth unit coil 5 (FIG. 20A, FIG. 20B). When all the 48 unit coils 5 have been accommodated in the stator core 2, the structure shown in FIG. 1 is obtained. Thereafter, the connection portions 8 of the respective unit coils 5 are connected to each other to form the stator coil 4, and thus the stator 10 is formed.

Since the stator 10 is formed as described above, the unit coil 5 having the shape as shown in FIG. 2 can be inserted in the slots 3 of the stator core 2 while substantially keeping the shape. Therefore, as shown in FIG. 1B, the shape of the unit coil 5 inserted in the stator core 2 is substantially identical to the shape of the unit coil 5 shown in FIG. 2. In this respect, it is clear that mountability of the unit coils 5 to the slots 3 of the stator core 2 is improved and insulating performance is maintained.

Next, a difference between the present disclosure and a comparative example will be described with reference to the drawings. A stator of the comparative example is structured as shown in FIG. 22A. A unit coil after being inserted in a stator core of the stator is structured as shown in FIG. 22B. The unit coil before being inserted in the stator core of the stator is structured as shown in FIG. 23A. An intermediate body of the unit coil is structured as shown in FIG. 24. In a manufacturing method according to the comparative example, as shown in FIG. 25, a conductive wire is wound around a winding frame having a hexagonal outer shape to form an intermediate body of a unit coil. Therefore, as shown in FIG. 24, the intermediate body of the unit coil is formed in a linear shape in the stacking direction H at all portions thereof including coil end portions and accommodation portions.

When the coil end portions of the intermediate body are bent to form the unit coil, the unit coil is structured as shown in FIG. 23A. Then, the unit coil formed as shown in FIG. 23A is mounted to the stator core as shown in FIG. 22. At this time, as shown in FIG. 23B, the position of each coil end portion of the unit coil varies in the axial direction Y. If unit coils having such a shape are arranged in the circumferential direction Z, a distance W10 between the adjacent unit coils needs to be long as shown in FIG. 26. It is difficult to dispose the unit coils, having this shape, in predetermined positions in the circumferential direction Z. Therefore, a work of mounting the unit coils one by one is performed while shaping each unit coil by using a wooden hammer, a spatula, or the like to avoid overlapping of the coil end portions of adjacent unit coils in the circumferential direction Z. As a result, as shown in FIG. 22B, the shape of each unit coil after being inserted in the stator core of the stator is deformed from the shape of the unit coil before the insertion as shown in FIG. 23A.

In contrast to the comparative example, in embodiment 1, as shown in FIG. 21, the positions of the coil end portions 71, 72 in the axial direction Y are aligned, which allows a distance W9 between adjacent unit coils 5 in the circumferential direction Z to be short. As a result, the unit coils can be easily mounted to the predetermined slots 3.

Next, a difference between the present disclosure and another comparative example will be described with reference to the drawings.

Figure 27A:
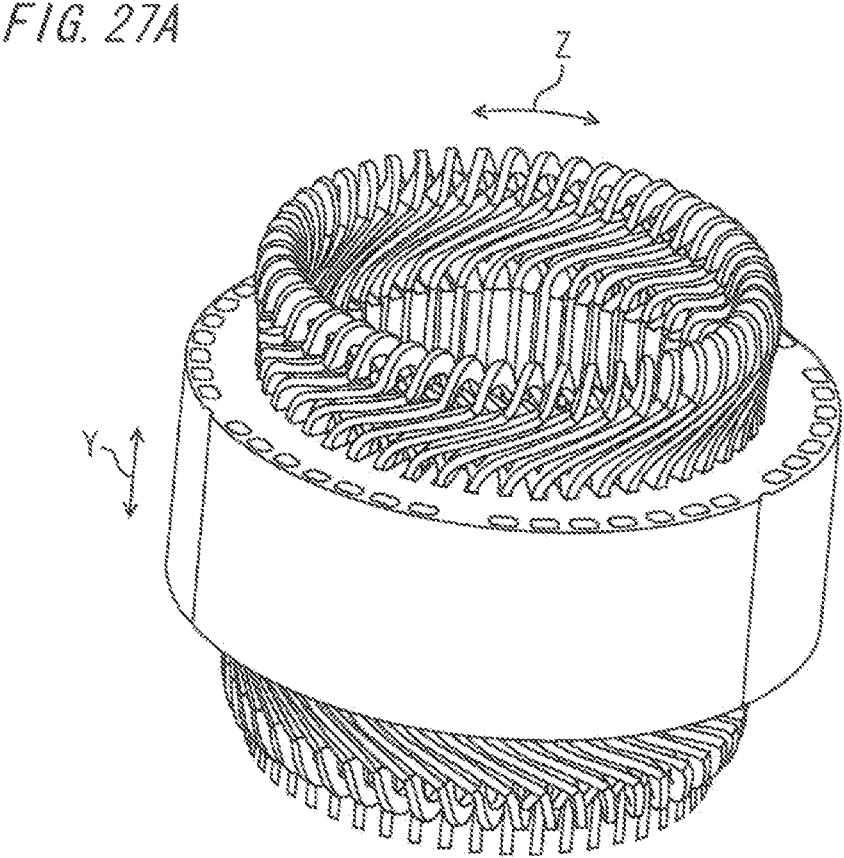
FIG. 27A is a perspective view showing the structure of a stator of a rotary electric machine according to another comparative example.

FIG. 27A is a perspective view showing the structure of a stator of a rotary electric machine according to the other comparative example.

Figure 27B:
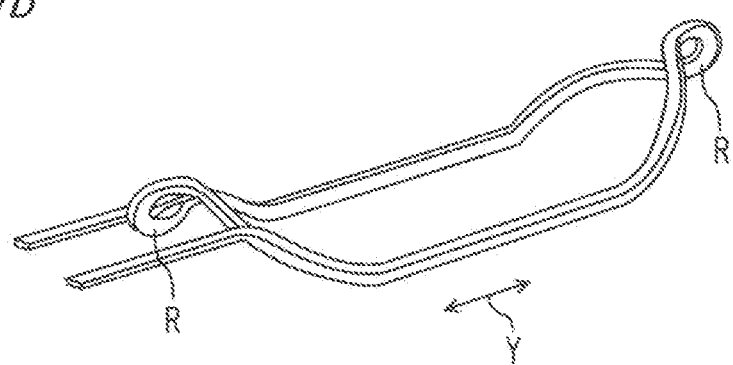
FIG. 27B is a perspective view showing the structure of a unit coil after being inserted in a stator core of the stator according to the other comparative example shown in FIG. 27A.

FIG. 27B is a perspective view showing the structure of a unit coil after being inserted in a stator core of the stator according to the other comparative example shown in FIG. 27A. In the unit coil according to the other comparative example, each of end parts of coil end portions in the axial direction Y has a loop shape R.

A difference between the unit coil of the other comparative example formed as described above and the unit coil of the present disclosure will be described with reference to FIG. 28. FIG. 28A shows the structure of the unit coil 5 shown in FIG. 1B according to the present disclosure. FIG. 28B shows the structure of the unit coil according to the other comparative example. FIGS. 28A and 28B illustrate the relationship of the magnitudes of angles γ1 and γ2 of hypotenuses of the coil end portions when the unit coils shown in FIGS. 28A and 28B have the same length L2 in the axial direction Y and the same length L1 of the coil end portions in the axial direction Y.

As shown in FIG. 28A, in the unit coil 5 of embodiment 1, since the end part of each of the coil end portions 71, 72 in the axial direction Y is not formed in a loop shape, the dimension of the coil end portion in the axial direction Y can be made shorter than that of the unit coil of the other comparative example. Therefore, when the unit coil 5 of embodiment 1 and the unit coil of the other comparative example are manufactured to have the same length L2 of the unit coil in the axial direction Y and the same length L1 of the coil end portion in the axial direction Y as shown in FIG. 28, the angle γ1 of the hypotenuses of the coil end portions 71, 72 becomes larger than the angle γ2 of the hypotenuses of the coil end portions of the other comparative example. Thus, it is geometrically clear that the angle γ1 of the unit coil 5 of the present disclosure is larger than the angle γ2 of the unit coil of the other comparative example.

When the angle γ1 of the hypotenuses of the coil end portions 71, 72 is large as in the present disclosure, the interval between the hypotenuses of the coil end portions 71, 72 of adjacent unit coils 5 is increased when the unit coils 5 are mounted to the stator core 2. In addition, since the amount of air passing through the space between the hypotenuses of the coil end portions 71, 72 is increased, the temperature of the coil end portions 71, 72 is suppressed to be low, resulting in improved performance of the rotary electric machine.

In the unit coil 5 of the present disclosure, the length L1 of the coil end portions 71, 72 can be easily changed by changing the dimension, in the axial direction Y, of the second shaft member 212 with respect to the third shaft member 213 and the sixth shaft member 216, and the dimension, in the axial direction Y, of the first shaft member 211 with respect to the fourth shaft member 214 and the fifth shaft member 215, in the winding device 20 for manufacturing the intermediate body 50 of the unit coil 5 shown in FIG. 7.

Figure 29A:
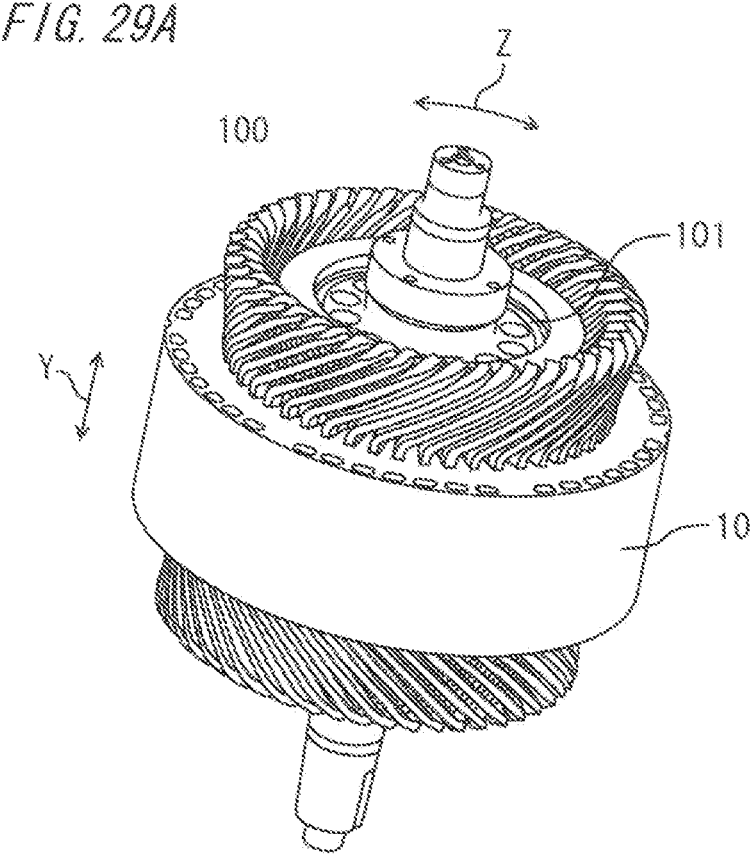
FIG. 29A is a perspective view showing the structure of a rotary electric machine including a stator using unit coils according to embodiment 1.
Figure 29B:
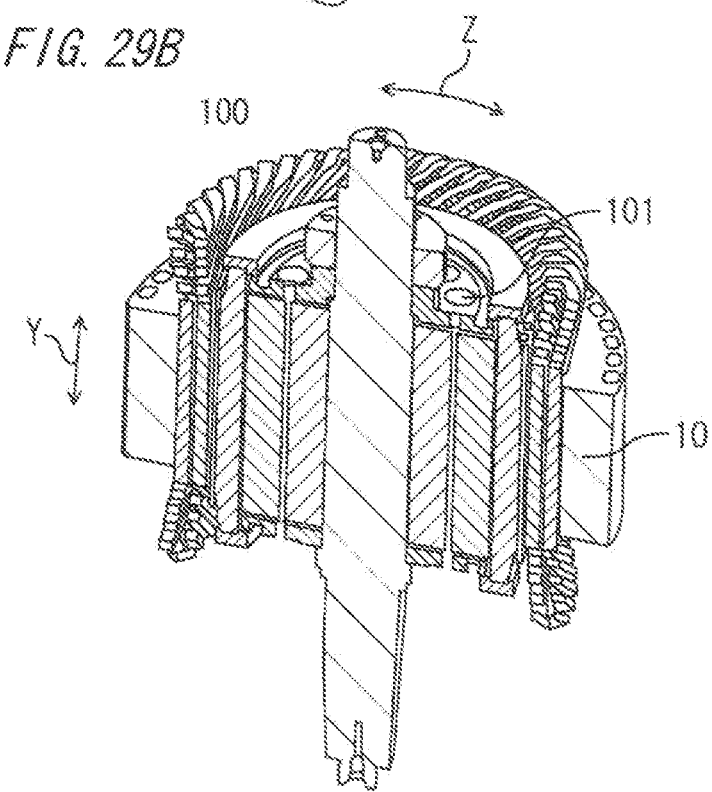
FIG. 29B is a perspective view, in an axial cross section, showing the structure of the rotary electric machine shown in FIG. 29A.
Figure 30:
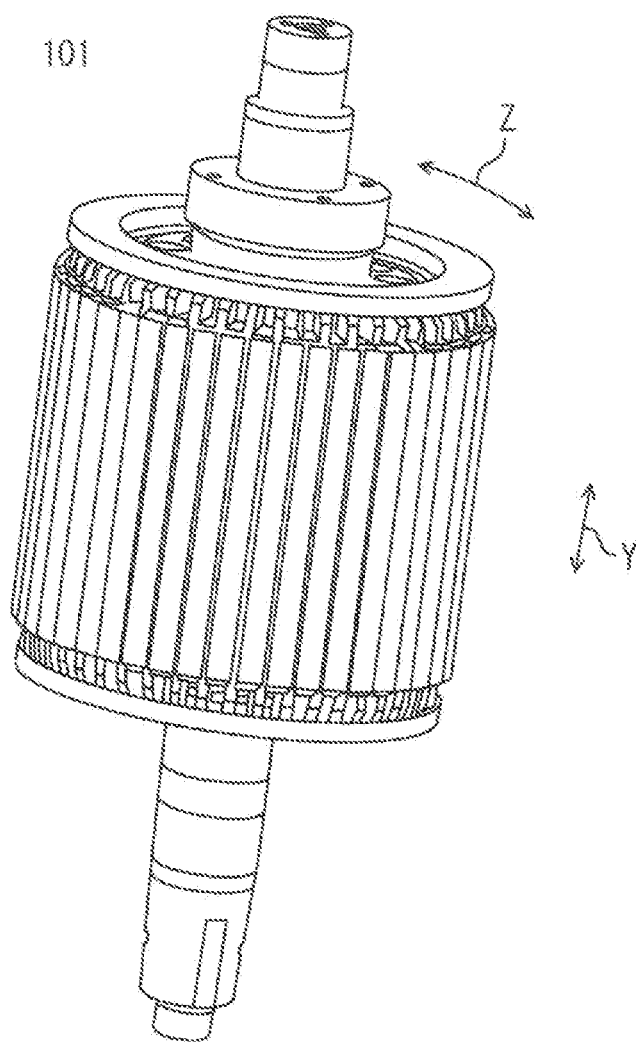
FIG. 30 is a perspective view showing the structure of a rotor of the rotary electric machine shown in FIG. 29.

Next, a rotary electric machine 100 including the stator 10 having the unit coils 5 manufactured as described above, will be described with reference to FIG. 29 and FIG. 30. FIG. 29A is a perspective view showing the structure of a rotary electric machine composed of a rotor, and a stator having unit coils according to the present disclosure. FIG. 29B is a cross-sectional view showing an axial cross section of the rotary electric machine shown in FIG. 29A. FIG. 30 is a perspective view showing the structure of a rotor of the rotary electric machine shown in FIG. 29A. As shown in FIG. 29, a rotor 101 is rotatably disposed so as to oppose the inner circumferential side of the stator 10 via a gap, thereby forming the rotary electric machine 100.

A method for manufacturing a unit coil for a stator of a rotary electric machine according to embodiment 1 is a method for manufacturing a unit coil for a stator of a rotary electric machine, in which the unit coil is inserted in a plurality of slots formed on an inner circumferential side of an annular stator core at intervals in a circumferential direction, and a plurality of the unit coils are arranged in an annular shape to form a stator coil, wherein the unit coil is formed in an annular shape, and has accommodation portions to be accommodated in predetermined two slots among the respective slots, and coil end portions connecting both ends, in an axial direction of the rotary electric machine, of each accommodation portion, and the method includes:

a winding step of winding a conductive wire a plurality of times into an annular shape to stack the conductive wire in a plurality of layers such that each of the coil end portions is stacked in layers so as to have a stair-like outer shape in a stacking direction and each of the accommodation portions is stacked in layers so as to have a linear outer shape in the stacking direction, thereby forming an intermediate body of the unit coil; and a forming step of forming the unit coil by bending the coil end portions of the intermediate body such that, in a layer in which a length in the axial direction between the coil end portions is large, positions of the coil end portions projecting furthest from the accommodation portions in the axial direction move away from positions of the accommodation portions in the stacking direction, compared to the state in the winding step, and by aligning the positions, in the axial direction, of the coil end portions at the inner side of the annular shape, for each of the layers.

Meanwhile, a rotary electric machine according to embodiment 1 includes:

a stator including an annular stator core having a plurality of slots formed on an inner circumferential side thereof at intervals in a circumferential direction, and a stator coil composed of a plurality of unit coils arranged in an annular shape and inserted in the slots; and a rotor rotatably disposed so as to oppose the inner circumferential side of the stator via a gap, wherein the unit coil is formed in an annular shape, and has accommodation portions accommodated in predetermined two slots among the respective slots, and coil end portions connecting both ends, in an axial direction of the rotary electric machine, of each accommodation portion, the unit coil is formed by winding a conductive wire a plurality of times into an annular shape so as to be stacked in a plurality of layers, and when the unit coil is deformed such that positions of the coil end portions coincide with positions of the accommodation portions in a stacking direction, each of the coil end portions is stacked in layers so as to have a stair-like outer shape in the stacking direction and each of the accommodation portions is stacked in layers so as to have a linear outer shape in the stacking direction, and the coil end portions are bent such that, in a layer in which a length in the axial direction between the coil end portions is large, the positions of the coil end portions projecting furthest from the accommodation portions in the axial direction move away from the positions of the accommodation portions in the stacking direction, and the positions, in the axial direction, of the coil end portions at the inner side of the annular shape are aligned for each of the layers.

Thus, the positions, in the axial direction, of the coil end portions of the unit coil at the inner side of the annular shape are aligned for each layer. Therefore, when the plurality of unit coils are disposed at intervals in the circumferential direction, the length of the interval in the circumferential direction between the unit coils can be set to be short, thereby realizing a rotary electric machine that prevents deterioration in insulating performance, and has high productivity.

Specifically, for example, in the case of PATENT DOCUMENT 1, a unit coil is formed into a final shape through a winding step, a one-part bending step, a two-part twisting step, and an R-shaped coil end formation step. Meanwhile, in the present disclosure, a unit coil can be formed through two steps, i.e., a winding step of winding a conductive wire in layers with a step difference for each layer, and a forming step of forming a unit coil by bending coil end portions. Therefore, the number of steps can be reduced.

According to the rotary electric machine and the method for manufacturing a unit coil for a stator of the rotary electric machine of embodiment 1, the coil end portions at both ends in the axial direction of the rotary electric machine each have a length extending from one of the accommodation portions to the other accommodation portion, and the length of a layer, of the coil end portions, on a side to be bent in a direction away from the positions of the accommodation portions, is formed to be longer than the length of a layer on a side closer to the positions of the accommodation portions. Therefore, when the unit coils are disposed in the slots of the stator core, the positions, in the axial direction, of the coil end portions are aligned with each other. Therefore, the distance between adjacent unit coils in the circumferential direction can be set to be short, which facilitates mounting of the unit coils in the predetermined slots.

According to the method for manufacturing a unit coil for a stator of a rotary electric machine of embodiment 1, in the winding step, stacking of each coil end portion to form the stair-like outer shape is performed with a step amount, in the stacking direction, which is, at maximum, ½ of a thickness of the conductive wire in the stacking direction.

Meanwhile, according to the rotary electric machine of embodiment 1, when the coil end portions are deformed such that the positions thereof coincide with the positions of the accommodation portions in the stacking direction, each of the coil end portions has a stair-like outer shape having a step amount, in the stacking direction, which is, at maximum, ½ of a thickness of the conductive wire in the stacking direction.

Therefore, when the unit coils are disposed in the slots of the stator core, the positions, in the axial direction, of the coil end portions can be reliably aligned with each other. Therefore, the distance between adjacent unit coils in the circumferential direction can be reliably set to be short, which further facilitates mounting of the unit coils in the predetermined slots.

According to the method for manufacturing a unit coil for a stator of a rotary electric machine of embodiment 1, in the forming step, the unit coil is formed such that an interval between the accommodation portions of the intermediate body is equal to an interval of the predetermined two slots in which the accommodation portions are to be inserted, and such that angles, in a circumferential direction, of the accommodation portions of the intermediate body are equal to angles, in the circumferential direction, of the predetermined two slots.

Therefore, the unit coil can be easily inserted in the predetermined two slots, thereby further improving productivity.

According to the method for manufacturing a unit coil for a stator of a rotary electric machine of embodiment 1, in the winding step, the intermediate body is stacked in layers so as to have a hexagonal annular shape by bending the conductive wire in a direction in which a plane, of the conductive wire, including a short side of a rectangular cross section is bent.

Therefore, the winding step can be easily performed, thereby further improving productivity.

According to the method for manufacturing a unit coil for a stator of a rotary electric machine of embodiment 1, since the conductive wire has a rectangular cross section, downsizing and higher output of the rotary electric machine can be realized.

According to a device for manufacturing a unit coil for a stator of a rotary electric machine, to be used for the winding step of the method for manufacturing a unit coil for a stator of a rotary electric machine, the device includes:
  a base plate;
  a first shaft member and a second shaft member disposed on the base plate at both ends, in the axial direction, of formation positions of the coil end portions of the intermediate body, each shaft member being cylindrical and having a stair-like outer shape;
  a third shaft member, a fourth shaft member, a fifth shaft member, and a sixth shaft member disposed on the base plate at both ends, in the axial direction, of formation positions of the accommodation portions of the intermediate body, each shaft member being cylindrical and having a linear outer shape; and
  a winding portion for winding the conductive wire along the outer shapes of the first shaft member, the second shaft member, the third shaft member, the fourth shaft member, the fifth shaft member, and the sixth shaft member.

Therefore, the conductive wire can be easily wound a plurality of times into an annular shape to be stacked in a plurality of layers such that the coil end portions each have a stair-like outer shape in the stacking direction and the accommodation portions each have a linear outer shape in the stacking direction.

For example, specifically, in the winding step described in Patent Document 2, a taper angle required for a formed coil is shaped in the stage of winding a coil, and a conductive wire having a rectangular cross section is wound while applying a tensile force to a winding surface thereof on which the taper angle is given. In the present disclosure, since the conductive wire has a rectangular cross section and the aspect ratio of the cross section is large, edgewise bending is required. Therefore, the conductive wire of the present disclosure cannot be accurately bent into a substantially hexagonal column shape by the method of winding a conductive wire having an almost square cross section as described in Patent Document 2. Therefore, a different winding device has been developed. This winding device allows a conductive wire to be bent into a predetermined shape, and allows a unit coil after bending of coil end portions to have a shape as designed.

According to a device for manufacturing a unit coil for a stator of a rotary electric machine, to be used for the winding step of the method for manufacturing a unit coil for a stator of a rotary electric machine,
  the winding portion includes: a first guide portion having an inverted-stair-like shape to which the stair-like outer shape of each of the first shaft member and the second shaft member fits, with the conductive wire being placed along the stair-like outer shape; and a second guide portion having a linear shape to which the liner outer shape of each of the third shaft member, the fourth shaft member, the fifth shaft member, and the sixth shaft member fits, with the conductive wire being placed along the liner outer shape.

Therefore, it is possible to reliably realize: stacking of each coil end portion into a stair-like outer shape in the stacking direction; and stacking of each accommodation portion into a linear outer shape in the stacking direction.

In addition, since formation of the intermediate body into the unit coil is performed by use of the forming device, mounting of each unit coil is completed by only accommodating the pair of accommodation portions of the unit coil into the slots of the stator core. Thus, bending of coil end portions, which has conventionally been performed after mounting of a unit coil to a stator core, can be dispensed with, thereby improving productivity. In addition, since two coil end portions can be formed at the same time by pressing, productivity of unit coils is improved. Since a stator coil can be formed by only accommodating unit coils one by one into a stator core, an insulating film on a conductive wire is not likely to be damaged during the stator coil forming process, thereby improving insulation quality. Since each unit coil as a component of the rotary electric machine can be formed into an ideal shape in advance, interference between adjacent unit coils in the circumferential direction can be suppressed as much as possible. As a result, the height of the coil end portions downsizing of the stator and the rotary electric machine. Thus, the amount of copper used for the coils is reduced, thereby improving performance of the rotary electric machine. Embodiment 2.

Figure 31A:
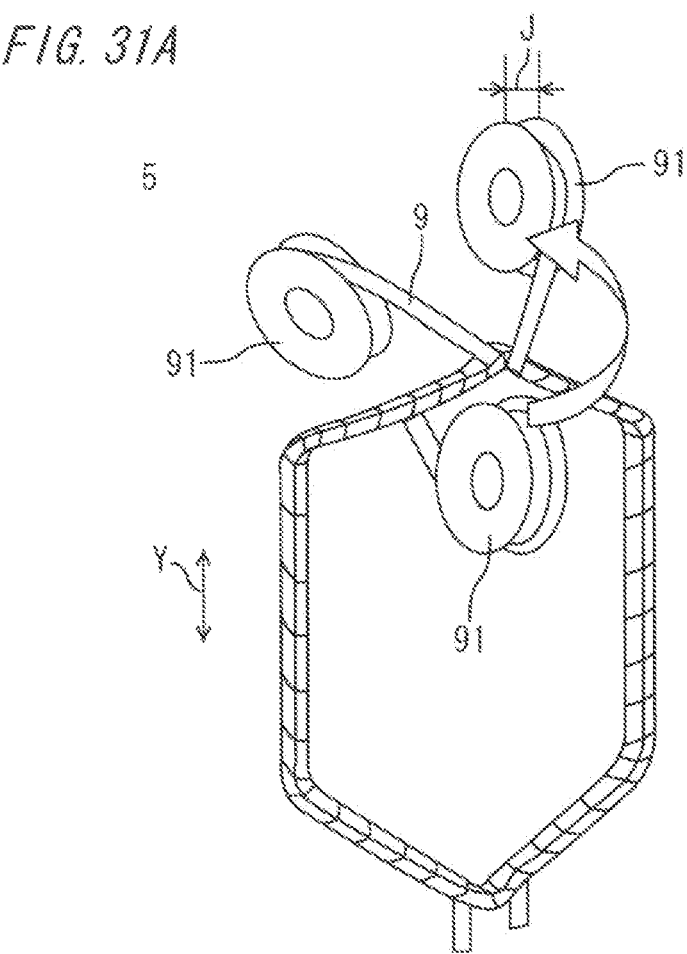
FIG. 31A is a perspective view showing a manufacturing method for a unit coil for a stator of a rotary electric machine, according to embodiment 2.
Figure 31B:
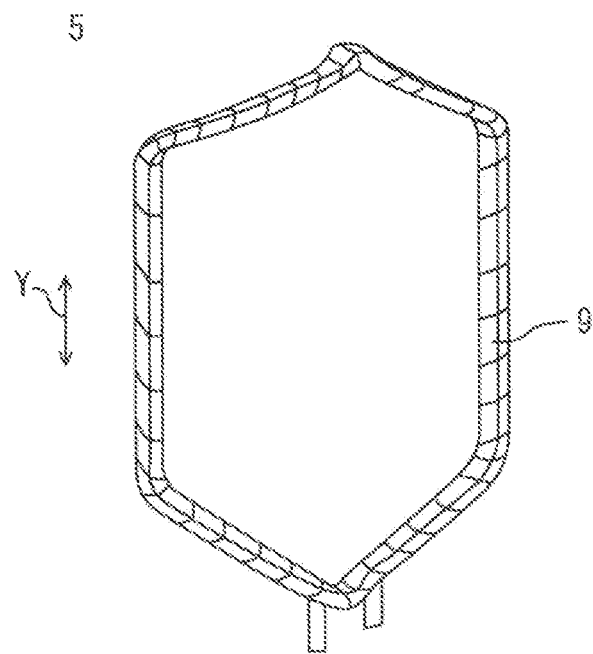
FIG. 31B is a perspective view showing the structure of the unit coil manufactured by the unit coil manufacturing method shown in FIG. 31A.
Figure 32A:
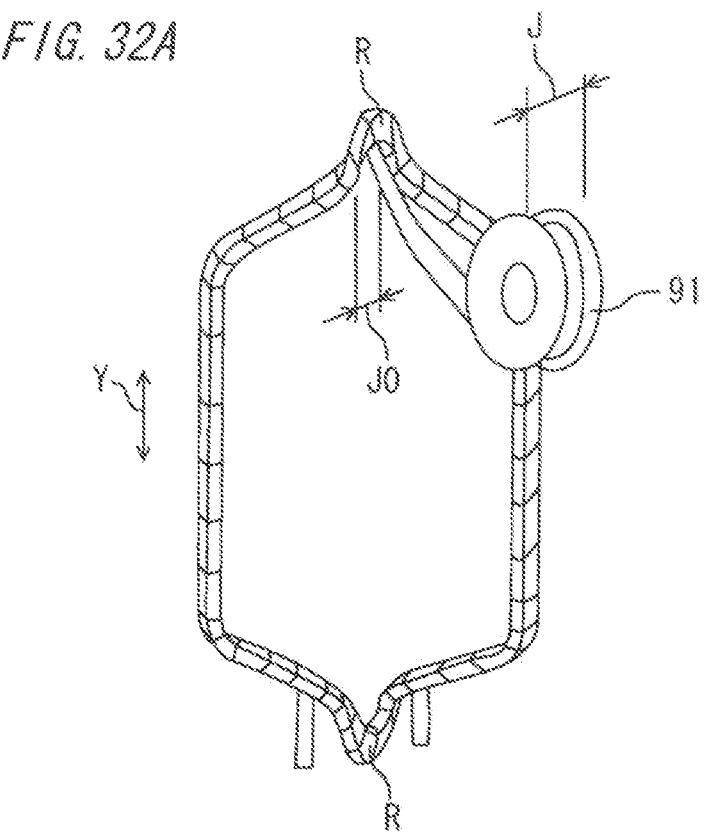
FIG. 32A is a perspective view showing a manufacturing method for a unit coil for a stator of a rotary electric machine, according to another comparative example.
Figure 32B:
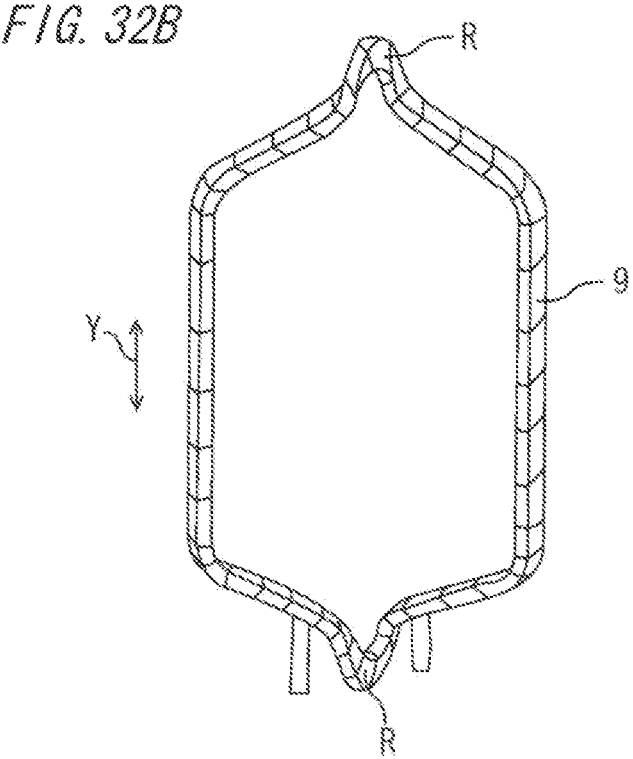
FIG. 32B is a perspective view showing the structure of the unit coil manufactured by the unit coil manufacturing method shown in FIG. 32A.

FIG. 31A illustrates an operation of winding an insulating tape on a unit coil that is manufactured by the same manufacturing method as in embodiment 1. FIG. 31B shows the state in which winding of the insulating tape on the unit coil, which has been manufactured by the manufacturing method shown in FIG. 31A, has finished. FIG. 32A illustrates an operation of winding an insulating tape on a unit coil similar to that of the other comparative example described in embodiment 1. FIG. 32B shows the state in which winding of the insulating tape on the unit coil similar to that of the other comparative example, which has been manufactured by the manufacturing method shown in FIG. 32A, has finished.

In embodiment 2, a description will be given of a case where an insulating tape 9 is wound on a unit coil 5 for the purpose of electrical insulation between the stator core 2 and the unit coil 5 or between unit coils 5. The insulating tape 9 is wound over the entire periphery of the unit coil 5, at a constant pitch, with an overlapping width equivalent to ⅓ to ½ of a width J of the insulating tape 9. As shown in FIG. 31A and FIG. 31B, since the coil end portions 71, 72 of the unit coil 5 of embodiment 2 each have a wave shape, it is easy to cause an insulating tape bobbin 91 to pass through the inner side of the annular shape of the coil end portions 71, 72, which facilitates winding of the insulating tape 9 at the constant pitch.

Meanwhile, in the other comparative example, as shown in FIG. 32A and FIG. 32B, when an insulating tape is wound on the unit coil of the other comparative example, since the end parts, in the axial direction Y, of the coil end portions each have a loop shape R, a width J0 of the end part in the axial direction Y of each coil end portion is smaller than the width J of the insulating tape bobbin 91, which makes it very difficult to wind the insulation tape 9 at a constant pitch while passing the insulating tape bobbin 91 through the inner side of the loop shape R. Therefore, significant man-hours are required, leading to poor productivity.

Furthermore, in the unit coil of the other comparative example, taping of the insulating tape is manually performed because the end part, in the axial direction Y, of each coil end portion has the loop shape R.

In contrast, since the unit coil 5 of embodiment 2 allows the insulating tape bobbin 91 to easily pass through the inner side of each of the coil end portions 71, 72, automatic winding using a taping device is realized, for example, whereby productivity is significantly improved.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 conductive wire
10 stator
100 rotary electric machine
101 rotor
11 conductor
12 insulating film
2 stator core
20 winding device
211 first shaft member
212 second shaft member
213 third shaft member
214 fourth shaft member
215 fifth shaft member
216 sixth shaft member
23 winding portion
241 first guide portion
242 second guide portion
25 handle
28 base plate
3 slot
30 placement table
4 stator coil
40 forming device
41 movable plate
421 first holding portion
422 groove
43 slide portion
44 lower unit
441 lower die
46 rotary shaft
47 guide bar
48 upper unit
481 upper die
491 second holding portion
5 unit coil
50 intermediate body
6 accommodation portion
71 coil end portion
72 coil end portion
8 connection portion
H stacking direction
J width
J0 width
M center point
R loop shape
W1 vertical dimension
W1 thickness
W2 horizontal dimension
W3 width
W3 step amount
W4 width
W5 length
W6 length
W7 interval
W8 interval
W9 distance
W10 distance
Y axial direction
Z circumferential direction
α angle
β angle
γ1 angle
γ2 angle

The invention claimed is:

1. A method for manufacturing a unit coil for a stator of a rotary electric machine, in which the unit coil is inserted in a plurality of slots formed on an inner circumferential side of an annular stator core at intervals in a circumferential direction, and a plurality of the unit coils are arranged in an annular shape to form a stator coil, wherein
the unit coil is formed in an annular shape, and has accommodation portions to be accommodated in predetermined two slots among the respective slots, and coil end portions connecting both ends, in an axial direction of the stator core, of each accommodation portion, the method comprising:
  winding a conductive wire using a winding device having first and second shaft members, each having a stair-like outer shape, a plurality of times into an annular shape to stack the conductive wire in a plurality of layers such that the coil end portions each have a stair-like outer shape in a stacking direction and the accommodation portions each have a linear outer shape in the stacking direction, thereby forming an intermediate body of the unit coil, the first shaft member and the second shaft member each having the stair-like outer shape that allows the conductive wire in the coil end portions to be stacked in layers in the stacking direction while shifting the conductive wire by a predetermined step amount in one direction orthogonal to the stacking direction; and
  a forming step of forming the unit coil by bending the coil end portions of the intermediate body such that, in a layer in which a length in the axial direction between the coil end portions is largest, positions of each of the coil end portions projecting furthest from the accommodation portions in the axial direction move away from positions of the accommodation portions in the stacking direction, compared to the state in the winding step.

2. The method for manufacturing a unit coil for a stator of a rotary electric machine, according to claim 1, wherein
  the coil end portions at both ends in the axial direction of the stator core each have a length extending from one of the accommodation portions to the other accommodation portion,
  the length of a layer, of the coil end portions, on a side to be bent in a direction away from the positions of the accommodation portions, is formed to be longer than the length of a layer on a side closer to the positions of the accommodation portions, and
  the layers of the coil end portions are bent at the same position in the axial direction with respect to the accommodation portions.

3. The method for manufacturing a unit coil for a stator of a rotary electric machine according to claim 2, wherein
  in the forming step, by rotating the intermediate body within a plane orthogonal to the axial direction of the stator core while holding the accommodation portions of the intermediate body,
  the unit coil is formed such that an interval between the accommodation portions of the intermediate body is equal to an interval of the predetermined two slots in which the accommodation portions are to be inserted, and
  such that angles, in a circumferential direction, of the accommodation portions of the intermediate body are equal to angles, in the circumferential direction, of the predetermined two slots.

4. The method for manufacturing a unit coil for a stator of a rotary electric machine according to claim 2, wherein the conductive wire has a rectangular cross section.

5. The method for manufacturing a unit coil for a stator of a rotary electric machine according to claim 4, wherein
  in the winding step, the intermediate body is stacked in layers so as to have a hexagonal annular shape by bending the conductive wire in a direction in which a plane, of the conductive wire, including a short side of the rectangular cross section is bent.

6. The method for manufacturing a unit coil for a stator of a rotary electric machine according to claim 1, wherein
  in the forming step, by rotating the intermediate body within a plane orthogonal to the axial direction while holding the accommodation portions of the intermediate body,
  the unit coil is formed such that an interval between the accommodation portions of the intermediate body is equal to an interval of the predetermined two slots in which the accommodation portions are to be inserted, and
  such that angles, in a circumferential direction, of the accommodation portions of the intermediate body are equal to angles, in the circumferential direction, of the predetermined two slots.

7. The method for manufacturing a unit coil for a stator of a rotary electric machine according to claim 6, wherein the conductive wire has a rectangular cross section.

8. The method for manufacturing a unit coil for a stator of a rotary electric machine according to claim 1, wherein the conductive wire has a rectangular cross section.

9. The method for manufacturing a unit coil for a stator of a rotary electric machine according to claim 8, wherein
  in the winding step, the intermediate body is stacked in layers so as to have a hexagonal annular shape by bending the conductive wire in a direction in which a plane, of the conductive wire, including a short side of the rectangular cross section is bent.

10. The method for manufacturing a unit coil for a stator of a rotary electric machine, according to claim 1, wherein
  in the winding step, stacking of each coil end portion to form the stair-like outer shape is performed with a step width, in a direction perpendicular to the stacking direction, which is, at maximum, ½ of a thickness of the conductive wire in stacking direction.

11. The method for manufacturing a unit coil for a stator of a rotary electric machine, according to claim 1, wherein
  the first shaft member and the second shaft member each have the stair-like outer shape that allows a second conductive wire in the coil end portions to be stacked on a first conductive wire in the coil end portions in the stacking direction while shifting the second conductive wire with respect to the first conductive wire by a predetermined step amount in one direction orthogonal to the stacking direction, and that allows a third conductive wire in the coil end portions to be stacked on the second conductive wire while shifting the third conductive wire with respect to the second conductive wire by a predetermined step amount in the one direction orthogonal to the stacking direction.

12. A method for manufacturing a rotary electric machine, comprising:
  manufacturing the unit coil according to claim 1; and
  installing the unit coil in an intermediate structure of the rotary electric machine.

* * * * *